US010858488B2

(12) United States Patent
Maeda et al.

(10) Patent No.: US 10,858,488 B2
(45) Date of Patent: Dec. 8, 2020

(54) THERMOPLASTIC RESIN, MOLDED PRODUCT, FILM, AND LAYERED PRODUCT

(71) Applicant: KURARAY CO., LTD., Kurashiki (JP)

(72) Inventors: Kaori Maeda, Tainai (JP); Noboru Higashida, Tainai (JP); Takao Hoshiba, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/098,365

(22) PCT Filed: May 24, 2017

(86) PCT No.: PCT/JP2017/019329
§ 371 (c)(1),
(2) Date: Nov. 1, 2018

(87) PCT Pub. No.: WO2017/204243
PCT Pub. Date: Nov. 30, 2017

(65) Prior Publication Data
US 2019/0153175 A1 May 23, 2019

(30) Foreign Application Priority Data
May 27, 2016 (JP) .................... 2016-106480

(51) Int. Cl.
C08J 5/18 (2006.01)
C08L 51/06 (2006.01)
C08L 101/00 (2006.01)
G02B 5/30 (2006.01)
B32B 27/30 (2006.01)
C08L 33/08 (2006.01)
C08L 33/12 (2006.01)
C08L 51/04 (2006.01)
C09J 201/02 (2006.01)

(52) U.S. Cl.
CPC .............. C08J 5/18 (2013.01); B32B 27/30 (2013.01); C08L 33/08 (2013.01); C08L 33/12 (2013.01); C08L 51/04 (2013.01); C08L 51/06 (2013.01); C08L 101/00 (2013.01); G02B 5/30 (2013.01); G02B 5/305 (2013.01); C08L 2207/53 (2013.01); C09J 201/02 (2013.01); C09J 2203/326 (2013.01); C09J 2301/416 (2020.08)

(58) Field of Classification Search
CPC .. C08J 5/18; C08L 33/08; C08L 33/12; C08L 51/04; C08L 51/06; C08L 101/00; C08L 2207/53; C08L 2203/16; B32B 27/30; G02B 5/30; G02B 5/305; C08F 265/06; C09J 2301/416; C09J 261/02
USPC ....................................................... 523/201
See application file for complete search history.

(56) References Cited

U.S. PATENT DOCUMENTS

| 2002/0164490 | A1 | 11/2002 | Tadokoro et al. |
| 2010/0063210 | A1* | 3/2010 | Ozawa ................ C08F 293/005 525/94 |
| 2014/0187704 | A1 | 7/2014 | Kwon et al. |
| 2016/0053062 | A1 | 2/2016 | Maeda et al. |
| 2016/0280814 | A1* | 9/2016 | Nakao ....................... C08F 20/18 |
| 2019/0055393 | A1* | 2/2019 | Tsuji ........................ B29C 48/08 |

FOREIGN PATENT DOCUMENTS

| CN | 103910967 A | 7/2014 |
| CN | 105121486 A | 12/2015 |
| CN | 105121543 A | 12/2015 |
| EP | 2 784 107 A1 | 10/2014 |
| JP | 2000-86853 A | 3/2000 |
| JP | 2007-127893 A | 5/2007 |
| JP | 2010-78700 A | 4/2010 |
| JP | 2010-209126 A | 9/2010 |
| JP | 2010-231015 A | 10/2010 |
| JP | 2014-160164 A | 9/2014 |
| JP | 2014-232251 A | 12/2014 |
| JP | 2014-533764 A | 12/2014 |
| JP | 2015-123618 A | 7/2015 |

(Continued)

OTHER PUBLICATIONS

International Search Report dated Aug. 15, 2017 in PCT/JP2017/019329 filed on May 24, 2017.
Extended European Search Report dated Dec. 4, 2019, in Patent Application No. 17802829.6, citing documents AO-AQ and AS-AV therein, 8 pages.
Combined Chinese Office Action and Search Report dated Jun. 22, 2020 in the corresponding Chinese Patent Application No. 201780031768.7 (with English Translation) citing documents AO-AQ therein, 18 pages.

(Continued)

Primary Examiner — Hannah J Pak
(74) Attorney, Agent, or Firm — Oblon, McClelland, Maier & Neustadt, L.L.P.

(57) ABSTRACT

Provided is a thermoplastic resin composition that can be firmly bonded to an adherend with an active energy ray-curable adhesive provided therebetween, and provided are a molded product and a film each including such a thermoplastic resin composition. Also provided are a thermoplastic resin composition that is less likely to be whitened even when the adhesive permeates thereinto and a molded product and a film each including such a thermoplastic resin composition. The thermoplastic resin composition according to the present disclosure contains 70 to 95 mass % of a thermoplastic resin and 5 to 30 mass % of a multilayer structure polymer (C) having a multilayer particle structure, and the multilayer structure polymer (C) has a median diameter Da of no less than 200 nm and less than 500 nm when the median diameter Da is measured through a laser diffraction/scattering technique with the thermoplastic resin composition dissolved in acetone.

20 Claims, 4 Drawing Sheets

(56) References Cited

FOREIGN PATENT DOCUMENTS

| | | |
|---|---|---|
| JP | 2016-203416 A | 12/2016 |
| WO | WO 2014/167868 A1 | 10/2014 |
| WO | WO 2017/115787 A1 | 7/2017 |

OTHER PUBLICATIONS

Office Action dated Jul. 24, 2020 in corresponding TW Patent Application No. 106117537 w/machine translation.

* cited by examiner

THERMOPLASTIC RESIN, MOLDED PRODUCT, FILM, AND LAYERED PRODUCT

TECHNICAL FIELD

The present disclosure relates to thermoplastic resins, molded products and films including the thermoplastic resins, and layered products manufactured by laminating the thermoplastic resin films on adherends.

BACKGROUND ART

Thermoplastic resins and films including the thermoplastic resins are widely used in decorative applications and so on because of their ease of primary processing and secondary processing. In particular, acryl-based resin, which is a type of thermoplastic resins, is composed of an acryl-based polymer having a methacrylic acid ester as a primary component, is highly transparent, and has low moisture permeability. Thus, the acryl-based resin is widely used in optical applications, decorative applications, and so on. Films including thermoplastic resin compositions are often laminated onto adherends with adhesives provided therebetween. For example, a polarizing plate can be fabricated by laminating a film including a thermoplastic resin composition onto a polyvinyl alcohol-based polarizer.

Examples of adhesives to be used in the lamination described above include aqueous adhesives, such as a polyvinyl alcohol aqueous solution (Patent Literature 1). Aqueous adhesives contain water as a solvent. The stated lamination method in which an aqueous adhesive is used renders heating necessary for drying the solvent, and thus warping is likely to be produced in the layered product. Some layered products used in in-vehicle applications or the like are placed in a high-temperature environment of 100° C. or higher, for example, and warping is likely to be produced in the layered products in this case as well. Such warping is produced as a film including a thermoplastic resin composition expands or shrinks upon heating. A similar issue arises also in a case in which the solvent of an adhesive is an organic solvent.

To address this issue, an adhesive that does not require drying of a solvent for curing the adhesive can be used, and examples of such include an active energy ray-curable adhesive. As such an active energy ray-curable adhesive, Patent Literature 2 discloses an adhesive containing an N-substituted amide-based monofunctional monomer having a hydroxyl group and an acrylate-based polyfunctional monomer. In addition, Patent Literature 3 discloses an adhesive containing an epoxy compound, an oxetane compound, and a cationic photopolymerization initiator. Furthermore, Patent Literature 4 discloses an active energy ray-curable adhesive containing a polymeric monomer.

However, when a layered product is manufactured by coating a film including a thermoplastic resin composition with an active energy ray-curable adhesive, sufficient bonding strength cannot be obtained unless the layered product is irradiated with an active energy ray upon a certain period of time, e.g. one minute or more, having passed after the coating with the active energy ray-curable adhesive. Thus, it takes time from the coating with the active energy ray-curable adhesive to the irradiation with the active energy ray, which leads to shortcomings in the productivity of layered products.

To address this issue, Patent Literature 5 discloses a method of laminating an acryl-based film having a highly adhesive layer added to its bonding surface onto a polarizer with an active energy ray-curable adhesive provided therebetween. Such an acryl-based film is composed of a methacryl-based polymer with elastic particles blended therein. The polarizer is composed of a polyvinyl alcohol-based resin. This lamination method provides high bonding strength between the acryl-based film and the polarizer as the highly adhesive layer is interposed therebetween, but the cost of manufacturing the polarizer increases as the highly adhesive layer is required, and this required highly adhesive layer also poses a problem of low productivity. Furthermore, sufficient bonding strength cannot be obtained unless a highly adhesive layer is provided.

CITATION LIST

Patent Literature

Patent Literature 1: Japanese Unexamined Patent Application Publication No. 2007-127893
Patent Literature 2: Japanese Unexamined Patent Application Publication No. 2010-078700
Patent Literature 3: Japanese Unexamined Patent Application Publication No. 2010-209126
Patent Literature 4: Japanese Unexamined Patent Application Publication No. 2014-232251
Patent Literature 5: Japanese Unexamined Patent Application Publication No. 2014-160164

SUMMARY OF INVENTION

Technical Problem

The present disclosure is directed to providing a molded product and a film each including a thermoplastic resin composition that can be firmly bonded to an adherend with an active energy ray-curable adhesive provided therebetween. In addition, the following new issue has become apparent. Specifically, when a molded product and a film each including a thermoplastic resin composition is firmly bonded to an adherend, the adhesive permeates into the molded product or the film, and this leads to whitening of the molded product or the film. Accordingly, the present disclosure is directed to providing a thermoplastic resin composition that is less likely to be whitened even if the stated adhesive permeates into the thermoplastic resin composition.

Solution to Problem

With regard to the components of the thermoplastic resin composition, the present inventors focused on a multilayer structure polymer (C) forming a multilayer particle structure and diligently studied the physical properties of the multilayer particle structure. As a result, the present inventors have found that a thermoplastic resin composition containing a specific multilayer structure polymer (C) allows for obtaining a molded product and a film that are less likely to be whitened even if an active energy ray-curable adhesive permeates thereinto and that excel in the adhesiveness with the adhesive. Thus, the present disclosure has been completed.

The present disclosure includes the following configurations.

[1] A thermoplastic resin composition comprising:
70 to 95 mass % of a thermoplastic resin; and
5 to 30 mass % of a multilayer structure polymer (C) having a multilayer particle structure, wherein the multilayer structure polymer (C) has a median diameter Da of no less than 200 nm and less than 500 nm when the median diameter Da is measured through a laser diffraction/scattering technique with the thermoplastic resin composition dissolved in acetone.

[2] The thermoplastic resin composition according to [1], wherein the multilayer particle structure includes an inner layer and an outer layer covering the inner layer, the multilayer structure polymer (C) is a graft copolymer having a cross-linked rubber polymer component (I) and a polymer component (II) that is graft-bonded to the cross-linked rubber polymer component (I), the cross-linked rubber polymer component (I) includes, as a primary component, an acrylic acid alkyl ester unit having an alkyl group with a carbon number of 1 to 8, the cross-linked rubber polymer component (I) forming the inner layer, and the polymer component (II) contains 80 to 97 mass % of a methyl methacrylate unit and 3 to 20 mass % of an acrylic acid ester unit, the polymer component (II) forming the outer layer.

[3] The thermoplastic resin composition according to [2], wherein when a ratio of a mass of the graft-bonded polymer component (II) to a mass of the cross-linked rubber polymer component (I) is a graft rate of the graft copolymer, the graft rate is 11 to 33 mass %.

[4] The thermoplastic resin composition according to [2] or [3], wherein the acrylic acid ester unit includes at least one acrylic acid ester unit selected from benzyl acrylate, cyclohexyl acrylate, tetrahydrofurfuryl acrylate, and tert-butyl acrylate, and a number average (Fn) of a formula weight of the graft-bonded polymer component (II) is 15,000 to 62,000.

[5] The thermoplastic resin composition according to any one of [2] to [4], wherein a proportion of the polymer component (II) relative to 100 mass % of the multilayer structure polymer (C) is 10 to 25 mass %.

[6] The thermoplastic resin composition according to any one of [1] to [5], wherein when a median diameter of the multilayer structure polymer (C) measured with a laser diffraction/scattering technique in water is a median diameter De, the multilayer structure polymer (C) satisfies the following expression.

$$1.1 < Da/De \leq 2.0$$

[7] The thermoplastic resin composition according to any one of [1] to [6], wherein the thermoplastic resin contains a methacryl-based polymer (A) containing more than 97 mass % of a methyl methacrylate unit.

[8] The thermoplastic resin composition according to [7], wherein the thermoplastic resin contains the methacryl-based polymer (A) and an acryl-based copolymer (B) containing 80 to 97 mass % of a methyl methacrylate unit and 3 to 20 mass % of an acrylic acid ester unit, the acryl-based copolymer (B) has a glass transition temperature of 90 to 115° C., and the acryl-based copolymer (B) has a number-average molecular weight (MnB) of 15,000 to 50,000.

[9] The thermoplastic resin composition according to [8], wherein the number-average molecular weight (MnB) and the glass transition temperature (Tg [° C.]) of the acryl-based copolymer (B) satisfy the following expression.

$$365 \leq (MnB/1000) + 3.5 \times Tg \leq 420$$

[10] A molded product including the thermoplastic resin composition according to any one of [1] to [9].

[11] A film including the thermoplastic resin composition according to any one of [1] to [9].

[12] The film according to [11], wherein a dimensional change on heating obtained when the film is heated for 30 minutes at 100° C. is −2.0 to 2.0%.

[13] The film according to [11] or [12], wherein the film is an optical film.

[14] A layered product, wherein the film according to any one of [11] to [13] is laminated on an adherend with an active energy ray-curable adhesive provided therebetween.

[15] The layered product according to [14], wherein the adherend is a polarizer, and the layered product functions as a polarizing plate.

[16] The layered product according to [14] or [1 5], wherein the active energy ray-curable adhesive is an ultraviolet-curable adhesive.

[17] The layered product according to any one of [14] to [16], wherein the active energy ray-curable adhesive includes a cationically photopolymerizable compound.

Advantageous Effects of Invention

The molded product and the film each including the thermoplastic resin composition according to the present disclosure can be firmly bonded to an adherend with an active energy ray-curable adhesive provided therebetween and are less likely to be whitened even if the adhesive permeates thereinto.

DESCRIPTION OF EMBODIMENTS

Hereinafter, examples of embodiments to which the present disclosure is applied will be described. It is to be noted that the numerical values specified in the present specification indicate the values obtained when measurements are carried out through the methods illustrated in the examples described later. In addition, the numerical values "A to B" specified in the present specification indicate a range of values that are no less than a numerical value A nor greater than a numerical value B. In addition, a "film" according to the present disclosure is not limited by the thickness or the like and includes a "sheet" as defined by JIS. Furthermore, an "A unit" means a "structural unit derived from A."

A molded product and a film each including a thermoplastic resin composition according to the present embodiment can be affixed favorably to a surface of an adherend. A layered product is obtained by affixing the molded product or film including the thermoplastic resin composition to the adherend with an adhesive. The film including this thermoplastic resin composition is referred to simply as a film in some cases.

[Thermoplastic Resin Composition]

A thermoplastic resin composition according to the present disclosure contains 70 to 95 mass % of a thermoplastic resin with respect to 100 mass % of the thermoplastic resin composition.

Figure 1:
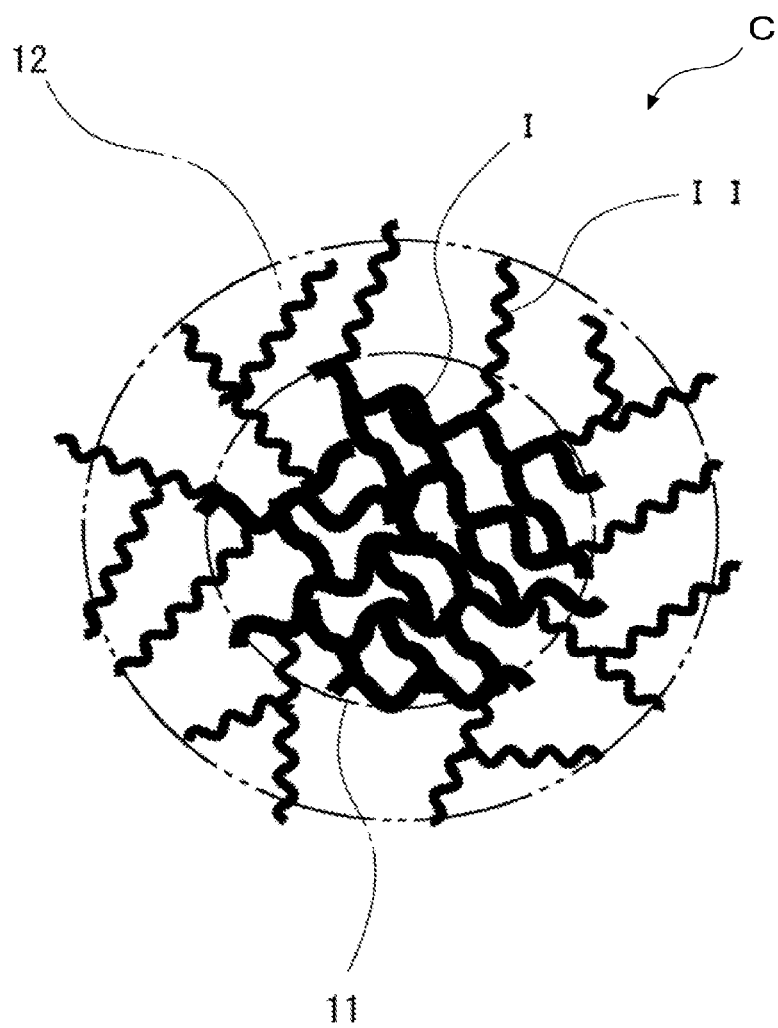
FIG. 1 is an example of a schematic diagram of a multilayer structure polymer (C) having a multilayer particle structure.

The thermoplastic resin composition further contains a multilayer structure polymer (C) having a multilayer particle structure illustrated in FIG. 1. The multilayer particle structure includes an inner layer 11 and an outer layer 12. These layers will be described later.

The multilayer structure polymer (C) is mixed in the thermoplastic resin. The thermoplastic resin composition contains 5 to 30 mass %, preferably 10 to 25 mass %, or more preferably 15 to 20 mass % of the multilayer structure polymer (C) with respect to 100 mass % of the thermoplastic resin composition.

The multilayer structure polymer (C) in no less than 5 mass % can increase the flexibility and the adhesiveness of the thermoplastic resin composition. Therefore, the molded product and the film each including the thermoplastic resin composition are easy to handle. The multilayer structure polymer (C) in no greater than 30 mass % can increase the surface hardness of the molded product and the film, and a dimensional change that could occur when the molded product and the film are heated can be suppressed.

[Size of Multilayer Structure Polymer (C)]

The multilayer structure polymer (C) has a median diameter Da of no less than 200 nm and less than 500 nm as the median diameter Da is measured through a laser diffraction/scattering technique with the thermoplastic resin composition according to the present disclosure dissolved in acetone. The median diameter Da of the multilayer structure polymer (C) may be any one of 210, 220, 230, 240, 250, 260, 270, 280, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 470, 480, and 490 nm. Herein, the median diameter Da is a mean value of the outer diameter of the multilayer particle structure of the multilayer structure polymer (C) and can be obtained specifically through a method described later in the examples. Setting the median diameter Da of the multilayer structure polymer (C) to the stated range allows the thermoplastic resin composition to have superior toughness. Accordingly, the molded product and the film each including the thermoplastic resin composition have superior toughness, experience less dimensional change upon heating, and excel in heat resistance. The thermoplastic resin composition also excels in permeability of an active energy ray-curable adhesive. Accordingly, when the molded product or film including the thermoplastic resin composition is bonded to an adherend, such as a polarizer, with an active energy ray-curable adhesive provided therebetween, high bonding strength can be obtained between the molded product or film and the adherend even without a highly adhesive layer or the like being provided.

[Selection of Thermoplastic Resin]

There is no particular limitation on the thermoplastic resin. Examples of the thermoplastic resin include norbornene-based resin, polycarbonate-based resin, polysulfone-based resin, polyethersulfone-based resin, (meth)acryl-based resin, polyallylate resin, polystyrene resin, and polyvinyl chloride-based resin. In addition, a resin in which two or more of the above are blended may also be used.

The use of (meth)acryl-based resin, or in particular, the use of methacryl-based resin having a methacrylic acid ester as a primary component for the thermoplastic resin allows for obtaining a film that excels in optical characteristics, or in particular, excels in transparency. The methacryl-based resin may include a ring structure. In the present specification, the methacryl-based resin selected as a component of the thermoplastic resin is referred to as a methacryl-based polymer (A) in some cases. The thermoplastic resin may include a component other than the methacryl-based polymer (A).

[Composition of Methacryl-based Polymer (A)]

The methacryl-based polymer (A) preferably contains more than 97 mass % of a methyl methacrylate unit. This can further increase the heat resistance and the surface hardness of the film. The methacryl-based polymer (A) may further contain less than 3 mass % of an acrylic acid alkyl ester unit. The methacryl-based polymer (A) need not contain any acrylic acid alkyl ester unit. In a more preferable composition of the methacryl-based polymer (A), the methyl methacrylate unit is no less than 98 mass %, and the acrylic acid ester unit is no greater than 2 mass %. In a yet more preferable composition, the methyl methacrylate unit is no less than 99 mass %, and the acrylic acid ester unit is 0 to 1 mass %. In an even more preferable composition, the methyl methacrylate unit is 100 mass %.

Examples of the acrylic acid alkyl ester unit include methyl acrylate, ethyl acrylate, propyl acrylate, butyl acrylate, and 2-ethylhexyl acrylate. A film including the methacryl-based polymer (A) that includes at least one of methyl acrylate and butyl acrylate has higher heat resistance and higher moldability and is more preferable than a film composed of a methacryl-based polymer (A) that includes any other acrylic acid alkyl ester unit in place of the aforementioned two.

The methacryl-based polymer (A) has a triad syndiotacticity (rr) of preferably 45 to 65% or more preferably 50 to 65%. The syndiotacticity of no less than 45% allows the thermoplastic resin to have a higher glass transition temperature. In addition, the film can have even superior chemical resistance.

Herein, the syndiotacticity (rr) is a proportion, expressed in percentage, in which the two diads in a triad are both racemo (denoted as rr). A triad is a linkage (triad) of three consecutive structural units. A diad is a linkage (diad) of two consecutive structural units. With regard to the linkages (diad) of the structural units in polymer molecules of the methacryl-based polymer (A), one in which the steric configurations of the structural units are the same between the structural units is referred to as meso (m), and one in which the steric configurations differ between the structural units is referred to as racemo (r).

To calculate the syndiotacticity (rr) (%), first, the $^1$H-NMR spectrum of the polymer molecules is measured in deuterated chloroform at 30° C. Then, an area (X) of a region spanning from 0.6 to 0.95 ppm and an area (Y) of a region spanning from 0.6 to 1.35 ppm, with tetramethylsilane (TMS) being set to 0 ppm, are calculated from the aforementioned spectrum. The syndiotacticity (rr) (%) is expressed by an expression: (X/Y)×100.

[Number-Average Molecular Weight of Methacryl-based Polymer (A)]

The number-average molecular weight (MnA) of the methacryl-based polymer (A) is preferably 25,000 to 75,000, more preferably 30,000 to 70,000, or even more preferably 35,000 to 60,000. The number-average molecular weight (MnA) of the methacryl-based polymer (A) is particularly preferably no less than 50,000.

Setting the number-average molecular weight (MnA) to no less than 25,000 improves the tearing strength of the film. Furthermore, the processability in manufacturing the layered product, namely, the reworkability improves. Accordingly, the yield rate in manufacturing the layered product improves. Setting the number-average molecular weight (MnA) to no greater than 75,000 improves the flowability of the thermoplastic resin composition containing the methacryl-based polymer (A). This provides improved processability when the molded product or the film is manufactured by molding the thermoplastic resin composition.

The number-average molecular weight (MnA) of the methacryl-based polymer (A) can be obtained through gel permeation chromatography (GPC) with the molecular weight of standard polystyrene serving as a reference and can be obtained specifically through a method described later in the examples.

[Manufacture of Methacryl-based Polymer (A)]

The methacryl-based polymer (A) can be manufactured through bulk polymerization, solution polymerization, suspension polymerization, emulsion polymerization, or the like. Among the above, either of bulk polymerization and solution polymerization is preferable. In particular, bulk polymerization is preferable. Of bulk polymerization, continuous bulk polymerization is preferable.

Aside from the components of the methacryl-based polymer (A), an acryl-based copolymer (B) is added to the thermoplastic resin in some cases. The polymerization reaction of the acryl-based copolymer (B) will be described separately.

The polymerization reaction can be initiated by adding a polymerization initiator to a polymerization reaction source material. The polymerization reaction source material is monomers constituting the methyl methacrylate unit and other structural units. In addition, adding a chain transfer agent to the polymerization reaction source material makes it possible to adjust the molecular weight of the obtained methacryl-based polymer (A).

The dissolved oxygen concentration in the polymerization reaction source material is preferably no greater than 10 ppm, more preferably no greater than 5 ppm, even more preferably no greater than 4 ppm, or most preferably no greater than 3 ppm. The use of the polymerization reaction source material with the dissolved oxygen concentration in the stated range allows the polymerization reaction to proceed smoothly. Accordingly, a silverish tint or other coloration is less likely to be produced in the film.

There is no particular limitation on the polymerization initiator as long as the polymerization initiator produces a reactive radical. Examples of the polymerization initiator include tert-hexylperoxy isopropyl monocarbonate, tert-hexylperoxy 2-ethylhexanoate, 1,1,3,3-tetramethylbutyl peroxy 2-ethylhexanoate, tert-butyl peroxypivalate, tert-hexyl peroxypivalate, tert-butyl peroxyneodecanoate, tert-hexyl peroxyneodecanoate, 1,1,3,3-tetramethylbutyl peroxyneodecanoate, 1,1-bis(tert-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), and dimethyl 2,2'-azobis(2-methylpropionate). Among the above, tert-hexylperoxy 2-ethylhexanoate, 1,1-bis(tert-hexylperoxy)cyclohexane, and dimethyl 2,2'-azobis(2-methylpropionate) are preferable.

The polymerization initiator preferably has a predetermined one-hour half-life period temperature. Such a temperature is preferably 60 to 140° C. or more preferably 80 to 120° C. The polymerization initiator used in bulk polymerization preferably has a predetermined hydrogen abstraction capacity. Such a hydrogen abstraction capacity is preferably no greater than 20%, more preferably no greater than 10%, or even more preferably no greater than 5%. These polymerization initiators may each be used alone, or two or more of these polymerization initiators may be used in combination. The amount of the polymerization initiator to be added, the method of adding the polymerization initiator, and so on may be set as appropriate in accordance with the purpose and are not particularly limited. For example, in bulk polymerization, the amount of the polymerization initiator is preferably 0.0001 to 0.02 parts by mass, more preferably 0.001 to 0.01 parts by mass, or even more preferably 0.005 to 0.007 parts by mass with respect to 100 parts by mass of the polymerization reaction source material.

Examples of the chain transfer agent include alkyl mercaptans, such as n-octyl mercaptan, n-dodecyl mercaptan, tert-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), and pentaerythritol tetrakis-thiopropionate. Among the above, monofunctional alkyl mercaptan, such as n-octyl mercaptan or n-dodecyl mercaptan, is preferable. These chain transfer agents may each be used alone, or two or more of these chain transfer agents may be used in combination. The amount of the chain transfer agent to be used is preferably 0.1 to 1 parts by mass, more preferably 0.15 to 0.8 parts by mass, even more preferably 0.2 to 0.6 parts by mass, or particularly preferably 0.2 to 0.5 parts by mass with respect to 100 parts by mass of the polymerization reaction source material. In addition, the amount of the chain transfer agent to be used is preferably 2,500 to 7,000 parts by mass, more preferably 3,500 to 4,500 parts by mass, or even more preferably 3,800 to 4,300 parts by mass with respect to 100 parts by mass of the polymerization initiator.

[Acryl-Based Copolymer (B)]

Blending the acryl-based copolymer (B) into the thermoplastic resin makes it possible to improve the dispersiveness of the multilayer structure polymer (C) in the thermoplastic resin and to increase the permeability of the active energy ray-curable adhesive. Manufacturing the acryl-based polymer (B) through emulsion polymerization allows for obtaining emulsion containing the acryl-based polymer (B). Therefore, when the multilayer structure polymer (C) is to be blended into the thermoplastic resin, it is preferable to mix the emulsion of the acryl-based polymer (B) and emulsion containing the multilayer structure polymer (C) in advance. In this case, coagulating the mixture of the acryl-based polymer (B) and the multilayer structure polymer (C) and blending the coagulum into the thermoplastic resin makes it possible to improve the dispersiveness of the multilayer structure polymer (C) in the thermoplastic resin and to increase the permeability of the active energy ray-curable adhesive.

[Composition of Acryl-Based Copolymer (B)]

The acryl-based copolymer (B) is composed, for example, of a methyl methacrylate unit and an acrylic acid ester unit. Herein, the methyl methacrylate unit in the acryl-based copolymer (B) is preferably 80 to 97 mass %. The acrylic acid ester unit is preferably 3 to 20 mass %. In a more preferable composition of the acryl-based copolymer (B), methyl methacrylate is 85 to 93 mass %, and acrylic acid ester is 7 to 15 mass %. The composition ratio of methyl methacrylate can be any one of 86, 87, 88, 89, 90, 91, and 92 mass %. The composition ratio of acrylic acid ester can be any one of 8, 9, 10, 11, 12, 13, 14, and 15 mass %.

[Number-Average Molecular Weight of Acryl-Based Copolymer (B)]

The range of the number-average molecular weight (MnB) of the acryl-based copolymer (B) is preferably 15,000 to 40,000 or more preferably 25,000 to 35,000. The number-average molecular weight (MnB) can be any one of $2.6 \times 10^4$, $2.7 \times 10^4$, $2.8 \times 10^4$, $2.9 \times 10^4$, $3.0 \times 10^4$, $3.1 \times 10^4$, $3.2 \times 10^4$, $3.3 \times 10^4$, and $3.4 \times 10^4$.

Setting the number-average molecular weight (MnB) to no less than 15,000 makes it possible to further improve the heat resistance of the thermoplastic resin composition. Setting the number-average molecular weight (MnB) to no greater than 40,000 makes it possible to further increase the permeation rate of the active energy ray-curable adhesive. Accordingly, the bonding strength between the molded product or film including the thermoplastic resin composition and an adherend can be improved. The number-average molecular weight (MnB) of the acryl-based copolymer (B) can be obtained through gel permeation chromatography (GPC) with the molecular weight of standard polystyrene serving as a reference and can be obtained specifically through a method described later in the examples.

[Glass Transition Temperature of Acryl-based Copolymer (B)]

The range of the glass transition temperature (Tg [° C.]) of the acryl-based copolymer (B) is preferably 90 to 115° C. or more preferably 95 to 110° C. The glass transition temperature (Tg [° C.]) can be any one of 96, 97, 98, 99, 100, 101, 102, 103, 104, 105, 106, 107, 108, and 109° C.

Setting the glass transition temperature (Tg [° C.]) to no less than 90° C. makes it possible to improve the heat resistance of the thermoplastic resin composition. Setting the glass transition temperature (Tg [° C.]) to no greater than 115° C. allows for an increase in the permeability of the active energy ray-curable adhesive into the thermoplastic resin composition. Accordingly, the bonding strength improves. The glass transition temperature can be obtained in accordance with JIS-K7121 and can be obtained specifically through a method described later in the examples.

[Relationship between MnB and Tg]

The number-average molecular weight (MnB) and the glass transition temperature (Tg [° C.]) of the acryl-based copolymer (B) preferably satisfy the following expression.

$$365 \leq (MnB/1000) + 3.5 \times Tg \leq 420$$

The acryl-based copolymer (B) that satisfies the above relational expression allows for achieving a high-level balance of the physical properties of the thermoplastic resin composition and the adhesiveness by the active energy ray-curable adhesive. The above relational expression indicates that the number-average molecular weight (MnB) is to be reduced when the glass transition temperature (Tg [° C.]) is high. In addition, the above relational expression indicates that the number-average molecular weight (MnB) is to be increased when the glass transition temperature (Tg [° C.]) is low.

Setting the value of $(MnB/1000)+3.5 \times Tg$ to no less than 365 makes it possible to increase the heat resistance of the thermoplastic resin composition while keeping the permeability of the active energy ray-curable adhesive into the thermoplastic resin composition from decreasing. The value of $(MnB/1000)+3.5 \times Tg$ is more preferably no less than 380 or even more preferably no less than 400. Setting the value of $(MnB/1000)+3.5 \times Tg$ to no greater than 420 makes it possible to increase the permeation rate of the active energy ray-curable adhesive into the thermoplastic resin composition while keeping the heat resistance of the thermoplastic resin composition from decreasing.

[Blending Ratio of Acryl-Based Copolymer (B)]

The blending ratio of the acryl-based copolymer (B) in the thermoplastic resin composition is preferably 5 to 15 mass % or more preferably 8 to 13 mass % with respect to 100 mass % of the thermoplastic resin composition. Setting the blending ratio to no less than 5 mass % allows for an improvement in the strength of bonding obtained by the active energy ray-curable adhesive. Setting the blending ratio to no greater than 15 mass % allows for an improvement in the heat resistance of the thermoplastic resin composition.

[Acrylic Acid Ester Unit of Acryl-Based Copolymer (B)]

The acrylic acid ester unit of the acryl-based copolymer (B) is, for example, a monofunctional acrylic acid ester. Examples of the acrylic acid ester include alkyl, cycloalkyl, phenyl, and esters of the derivatives of the above. The acryl-based copolymer (B) may include two or more of the above as the acrylic acid ester unit. Examples of monomers of the acrylic acid ester include methyl acrylate, ethyl acrylate, n-propyl acrylate, iso-propyl acrylate, n-butyl acrylate, iso-butyl acrylate, tert-butyl acrylate, 2-ethylhexyl acrylate, n-octyl acrylate, n-lauryl acrylate, hydroxyethylhexyl acrylate, cyclohexyl acrylate, isoboronyl acrylate, tetrahydrofuran acrylate, benzyl acrylate, and phenyl acrylate.

The acrylic acid ester is preferably at least any one of methyl acrylate, butyl acrylate, cyclohexyl acrylate, and benzyl acrylate. In this case, a high-level balance among the permeation rate of the active energy ray-curable adhesive into the film, the heat resistance of the film, the ease of handling of the film when manufacturing the layered product, and so on can be achieved. The film may be subjected to corona treatment before the film is bonded to an adherend with the active energy ray-curable adhesive. In this case, employing at least one of cyclohexyl acrylate and tert-butyl acrylate as the acrylic acid ester makes it possible to obtain the effect of the corona treatment at a sufficient level.

[Manufacture of Acryl-Based Copolymer (B)]

The acryl-based copolymer (B) is preferably manufactured through emulsion polymerization. The type and the amount of an emulsifying agent to be used can be selected as appropriate. Such a selection makes it possible to regulate the stability level of the polymerization reaction system. In addition, the diameter of particles of the acryl-based copolymer (B) in the emulsion of the acryl-based copolymer (B) can be regulated. Examples of the type of the emulsifying agent include an anionic surfactant, a cationic surfactant, and a nonionic surfactant. These emulsifying agents can each be used alone or can be used in combination. In the present embodiment, an anionic surfactant is preferable.

Examples of the anionic surfactant include carboxylic acid salts, such as sodium stearate, sodium myristate, and sodium N-lauroylsarcosinate; sulfonic acid salts, such as sodium dioctyl sulfosuccinate and sodium dodecylbenzene sulfonate; sulfate ester salts, such as sodium lauryl sulfate; phosphoric acid ester salts, such as sodium mono-n-butylphenyl pentaoxyethylene phosphate; polyoxyethylene alkyl ether carboxylic acid salts, such as sodium polyoxyethylene tridecyl ether acetate and sodium polyoxyethylene didecyl ether acetate; and polyoxyethylene alkyl phenyl ether phosphoric acid salts.

Among the above, carboxylic acid salts or phosphoric acid salts having at least one of a polyoxyethylene alkyl ether group and a polyoxyethylene phenyl ether group have high compatibility with an ester monomer of acrylic acid or methacrylic acid. Accordingly, these emulsifying agents can increase the permeability of the active energy ray-curable adhesive into the film. Specific examples of such an emulsifying agent include sodium polyoxyethylene tridecyl ether acetate and sodium polyoxyethylene alkyl phenyl ether phosphate.

The number-average particle size of liquid droplets of the acryl-based copolymer (B) in the emulsion is preferably ½ to 1/10 of the median diameter De of the multilayer structure polymer (C) serving as a reference. It is preferable to obtain such a number-average particle size by adjusting the amount of the emulsifying agent. The use of the acryl-based copolymer (B) having such a number-average particle size makes it possible to increase the dispersiveness of the multilayer structure polymer (C).

When the acryl-based copolymer (B) is manufactured through emulsion polymerization, a compound traceable to the emulsifying agent may remain as an impurity in some cases. Such an impurity traceable to the emulsifying agent may cause the performance of the thermoplastic resin composition to change and may act as a plasticizer, for example.

The emulsion of the acryl-based copolymer (B) is washed preferably until the melt viscosity ($\eta a$) of the emulsion of the acryl-based copolymer (B) becomes constant under the condition of 200° C. and 50 kg·f·cm². A preferable melt viscosity ($\eta a$) is 500 to 2,000 Pa·s. The melt viscosity ($\eta a$) can also be regulated through the molecular design of the acryl-based copolymer (B) described above. Therefore, a target melt viscosity ($\eta a$) to be obtained in washing may be set in accordance with the molecular design.

[Use of Other Agents in Emulsion Polymerization, Etc.]

There is no particular limitation on the polymerization initiator to be used in emulsion polymerization. Examples of the polymerization initiator to be used include inorganic peroxide, such as potassium persulfate and ammonium persulfate; water-soluble redox-based initiators, such as a hydrogen peroxide-ferrous salt-based initiator, a potassium persulfate-sodium bisulfite-based initiator, and an ammonium persulfate-sodium bisulfite-based initiator; and water-soluble, oil-soluble redox-based initiators, such as a cumene hydroperoxide-sodium formaldehyde sulfoxylate-based initiator and a tert-butyl hydroperoxide-sodium formaldehyde sulfoxylate-based initiator.

In addition, a chain transfer agent may be used in emulsion polymerization. Examples of the chain transfer agent include alkyl mercaptans, such as n-octyl mercaptan, n-dodecyl mercaptan, tert-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), and pentaerythritol tetrakisthiopropionate. Among the above, monofunctional alkyl mercaptan, such as n-octyl mercaptan or n-dodecyl mercaptan, is preferable.

In emulsion polymerization, the monomers, the emulsifying agent, the initiator, the chain transfer agent, and so on may be added upon selecting a well-known method as desired. Examples of the method include batch addition, divided addition, and continuous addition.

[Multilayer Structure Polymer (C)]

The multilayer structure polymer (C) having the multilayer particle structure illustrated in FIG. 1 will be described hereinafter. The multilayer structure polymer (C) is preferably a graft copolymer.

An example of the multilayer particle structure of the multilayer structure polymer (C) is illustrated in FIG. 1. The multilayer structure polymer (C) constituting the multilayer particle structure preferably includes a cross-linked rubber polymer component (I) and a polymer component (II). The polymer component (II) is preferably graft-bonded to the cross-linked rubber polymer component (I).

The multilayer particle structure illustrated in FIG. 1 includes an inner layer 11 and an outer layer 12. As illustrated in FIG. 1, the inner layer 11 is preferably formed of the cross-linked rubber polymer component (I). The inner layer 11 may be a monolayer or may include a plurality of layers of different compositions. In addition, the inner layer 11 may be an innermost layer or may have another layer of a different composition provided inward thereof. The outer layer 12 preferably covers the inner layer 11. The outer layer 12 may be an outermost layer or may have another layer of a different composition provided outward thereof. The outer layer 12 is preferably formed of the polymer component (II).

As illustrated in FIG. 1, the polymer component (II) preferably covers the cross-linked rubber polymer component (I). In this case, graft bonding is retained between the cross-linked rubber polymer component (I) and the polymer component (II).

FIG. 1 merely illustrates the multilayer structure polymer (C) schematically. As such, there is no limitation on the number of the cross-linked rubber polymer components (I) included in the inner layer 11 nor on the number of the polymer components (II) included in the outer layer 12.

[Composition of Cross-Linked Rubber Polymer Component (I)]

The cross-linked rubber polymer component (I) illustrated in FIG. 1 may include an acrylic acid alkyl ester unit as a primary component and include no less than 50 weight % of the acrylic acid alkyl ester unit and no greater than 50 weight % of a unit other than the acrylic acid alkyl ester unit. The cross-linked rubber polymer component (I) contains preferably 60 to 99 mass % or more preferably 70 to 90 mass % of the acrylic acid alkyl ester unit.

As the acrylic acid alkyl ester for synthesizing the cross-linked rubber polymer component (I), those of which the alkyl group has a carbon number of 1 to 8 are used. Examples of such an acrylic acid alkyl ester include methyl acrylate, ethyl acrylate, propyl acrylate, iso-propyl acrylate, n-butyl acrylate, sec-butyl acrylate, iso-butyl acrylate, tert-butyl acrylate, pentyl acrylate, hexyl acrylate, heptyl acrylate, and octyl acrylate.

Examples of monomers other than the acrylic acid alkyl ester include a polyfunctional monomer. Examples of the polyfunctional monomer include alkyl methacrylate, such as methyl methacrylate and ethyl methacrylate; styrene-based monomers, such as styrene and alkyl styrene; monofunctional monomers of unsaturated nitrile of the like, such as acrylonitrile and methacrylonitrile, alkenyl esters of unsaturated carboxylic acid, such as allyl (meth)acrylate and methallyl (meth)acrylate; dialkenyl esters of dibasic acid, such as diallyl maleate; and unsaturated carboxylic acid diesters of glycols, such as alkylene glycol di(meth)acrylate.

[Layer of Other Polymer Component]

Figure 2:
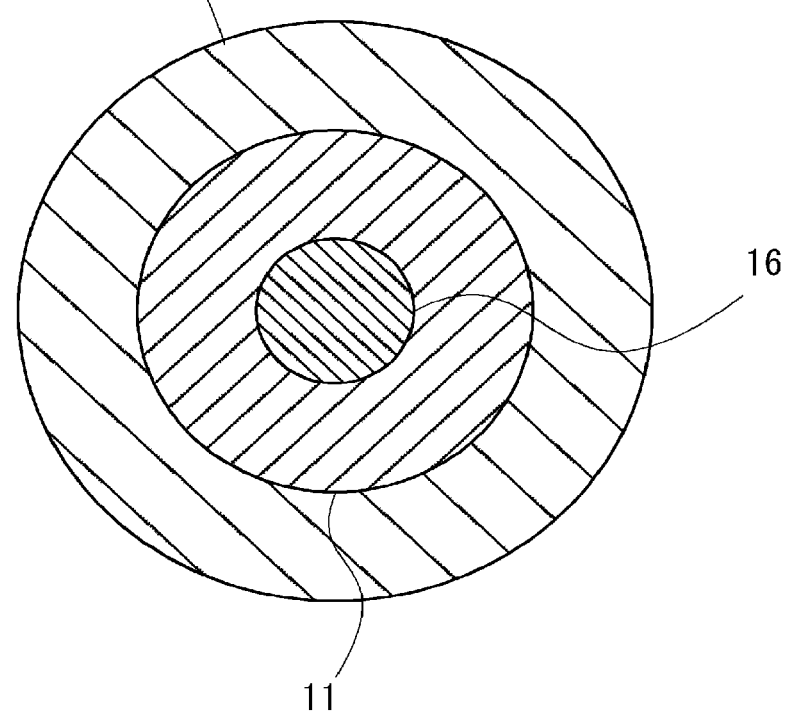
FIG. 2 is an example of a sectional view of the multilayer structure polymer (C) and illustrates the multilayer particle structure of the multilayer structure polymer (C)

A multilayer particle structure 15 illustrated in FIG. 2 includes a layer 16 composed of other polymer component provided inward of the inner layer 11. This other polymer component may include a methacrylic acid alkyl ester unit as a primary component. The other polymer component may be in covalent bonding-type bonding with the cross-linked rubber polymer component (I).

In place of the other polymer component, another cross-linked rubber polymer component (I) may be used. For example, the layer 16 may serve as a first layer, and the inner layer 12 may serve as a second layer. In this case, two types of cross-linked rubber polymer components (I) may be synthesized, and the respective cross-linked rubber polymer components (I) may be used in the first layer and the second layer. These cross-linked rubber polymer components (I) may be in covalent bonding-type bonding with each other.
[Composition of Polymer Component (II)]

The polymer component (II) illustrated in FIG. 1 preferably contains, in its composition, 80 to 97 mass % of the methyl methacrylate unit and 3 to 20 mass % of the acrylic acid ester unit. The polymer component (II) more preferably contains 90 to 97 mass % of the methyl methacrylate unit and 3 to 10 mass % of the acrylic acid ester unit.

In the acrylic acid ester unit, the ester group is, for example, alkyl, cycloalkyl, phenol, and ester groups of the derivatives of the above. The polymer component (II) may include two or more of these acrylic acid ester units.

Specific examples of the acrylic acid ester monomer include methyl acrylate, ethyl acrylate, n-propyl acrylate, iso-propyl acrylate, n-butyl acrylate, iso-butyl acrylate, tert-butyl acrylate, 2-ethylhexyl acrylate, n-octyl acrylate, n-lauryl acrylate, hydroxyethylhexyl acrylate, cyclohexyl acrylate, isobornyl acrylate, tetrahydrofurfuryl acrylate, benzyl acrylate, and phenyl acrylate.

The acrylic acid ester monomers are classified as follows. Combining the following classification groups (1) to (3) as appropriate allows for obtaining a suitable polymer component (II).

(1) A classification group including methyl acrylate and butyl acrylate provides the heat resistance to the thermoplastic resin composition. In addition, this classification group can increase the ease of handling of the thermoplastic resin composition. Accordingly, the balance of the physical properties of the thermoplastic resin composition can be retained at a high level.

(2) A classification group including benzyl acrylate and tetrahydrofurfuryl acrylate can improve the affinity between the thermoplastic resin composition and the active energy ray-curable adhesive.

(3) A classification group including cyclohexyl acrylate and tert-butyl acrylate is convenient for corona treatment on the surfaces of the molded product and the film each including the thermoplastic resin composition. An active group is likely to be produced on the surfaces of the molded product and the film subjected to corona treatment due to the acrylic acid ester structure included in this classification group, and the adhesiveness is increased by the film surface. The corona treatment can be performed before the surface of the molded product and the surface of the film are coated with the active energy ray-curable adhesive.
[Control of Graft Rate between Polymer Components (II)]

The graft rate is greatly affected by the amount of graft-bonded monomers contained in the cross-linked rubber polymer component (I). However, if the amount of the added graft-bonded monomers is increased to raise the graft rate, the cross-linked rubber polymer component (I) stiffens, and the toughness and the impact resistance of the molded product and the film tend to decrease. To solve such a problem and to supplement the graft bonding between the cross-linked rubber polymer component (I) and the polymer component (II), a graft-bonded polyfunctional monomer or a polyfunctional monomer may be blended into the monomer mixture for synthesizing the polymer component (II). In this case, from the viewpoint of reducing the graft bonding between the polymer component (II) and another polymer component (II), the functional groups of the graft-bonded monomers preferably have equal reactivity.

As the graft-bonded monomers, alkenyl esters of unsaturated carboxylic acid, such as allyl (meth)acrylate or methacryl (meth)acrylate, and dialkenyl esters of dibasic acid, such as diallyl maleate, are preferable.
[Number Average (Fn) of Formula Weight of Polymer Component (II)]

The number average (Fn) of the formula weight of the polymer component (II) can be no greater than 62,000. The number average (Fn) of the formula weight is preferably 15,000 to 62,000, more preferably 15,000 to 60,000, yet more preferably 20,000 to 55,000, or even more preferably 30,000 to 50,000. The number average of the formula weight can be the product of $10^3$ and any one of 31, 32, 33, 34, 35, 36, 37, 38, 39, 40, 41, 42, 43, 44, 45, 46, 47, 48, 49, 50, 51, 52, 53, 54, 55, 56, 57, 58, and 59.

When the number average (Fn) of the formula weight is no less than 15,000, conceivably, the mobility of the polymer component (II) is moderately reduced. As a result, the heat resistance of the thermoplastic resin film improves. When the number average (Fn) of the formula weight is no greater than 62,000 or more preferably no greater than 60,000, conceivably, the permeation rate of the active energy ray-curable adhesive into the thermoplastic resin composition improves. Accordingly, the bonding strength between the molded product or film including the thermoplastic resin composition and an adherend increases.

The number average (Fn) of the formula weight of the polymer component (II) can be adjusted by the amount of the blended chain transfer agent such as straight-chain thiol, including n-octyl mercaptan and lauryl mercaptan, and an α-methylstyrene dimer. This blending amount is the amount of the chain transfer agent blended into the monomer mixture for synthesizing the polymer component (II).

The number average (Fn) of the formula weight of the polymer component (II) is difficult to measure directly from the multilayer structure polymer (C). The number average (Fn) of the formula weight can be estimated from the number-average molecular weight of a polymer sample having a composition that is the same as the composition of the polymer component (II). Such a polymer sample includes neither the cross-linked rubber polymer component (I) nor the other polymer component. The polymer sample is synthesized by charging only the monomer mixture for synthesizing the polymer component (II) in a reaction system excluding the cross-linked rubber polymer component (I). The number-average molecular weight of the polymer sample having a composition that is the same as the composition of the polymer component (II) described above can be obtained through gel permeation chromatography (GPC) with the molecular weight of standard polystyrene serving as a reference and can be obtained specifically through a method described later in the examples.
[Control of Proportion of Graft-Bonded Monomers]

In synthesizing the polymer component (II), the proportion of monomers, among the monomers for synthesizing the polymer component (II), that are for graft polymerization with the cross-linked rubber polymer component (I) is controlled. This proportion is preferably 85 to 100 mass %, more preferably 90 to 100 mass %, or even more preferably 95 to 100 mass % with the amount of charged monomers of the polymer component (II) taken as 100 mass %. In other words, the smaller the proportion of the monomers of the polymer component (II) that are not for graft polymerization with the cross-linked rubber polymer component (I) is, the better.
[Definition of Graft Rate of Multilayer Structure Polymer (C)]

In the present specification, the graft rate of the multilayer structure polymer (C) is the graft rate between the cross-linked rubber polymer component (I) and the polymer component (II) and is defined as the ratio of the polymer component (II) graft-bonded to the cross-linked rubber polymer component (I). This graft rate (mass %) can be measured as follows.

First, the multilayer structure polymer (C) is immersed in acetone. Then, an acetone-soluble component and an acetone-insoluble component are separated by a centrifugal separator. The acetone-soluble component is removed from these components. The obtained acetone-insoluble component is dried, and its mass is measured. The graft rate is calculated in accordance with the following expression.

(graft rate)={[(mass of acetone-insoluble component)−(mass of cross-linked rubber polymer component (I))]/(mass of cross-linked rubber polymer component (I))}×100

Herein, the mass of the cross-linked rubber polymer component (I) is the total mass of the monomers of the cross-linked rubber polymer component (I) in polymerization.

[Range of Graft Rate of Multilayer Structure Polymer (C)]

The graft rate of the multilayer structure polymer (C) is preferably 11 to 33 mass % or more preferably 15 to 30 mass %. The graft rate can be any one of 16, 15, 17, 18, 19, 20, 21, 22, 23, 24, 25, 26, 27, 28, and 29 mass %.

Setting the graft rate to no less than 11 mass % makes it possible to improve the heat resistance of the thermoplastic resin film while retaining the permeation rate of the active energy ray-curable adhesive component at a predetermined level or higher. Setting the graft rate to no greater than 33 mass % conceivably allows for an increase in the permeation rate of the active energy ray-curable adhesive component. As a result, the bonding strength between the film and an adherend can be increased.

[Control of Graft Rate by Graft-Bonding Monomer]

The graft bonding between the cross-linked rubber polymer component (I) and the polymer component (II) can be controlled when synthesizing the multilayer structure polymer (C). Therefore, the graft rate of the multilayer structure polymer (C) can be controlled by the blending rate of the graft-bonded monomers. Adding the graft-bonding monomers in excess to the monomer mixture of the cross-linked rubber polymer component (I) enables the graft bonding of the polymer component (II). In addition, the graft-bonding monomers may be blended into the monomer mixture of the polymer component (II).

[Control of Graft Rate by Ratio of Polymer Component (II)]

In the present specification, the ratio of the polymer component (II) indicates the proportion (mass %) of the polymer component (II) in the multilayer structure polymer (C). In one aspect, the ratio of the polymer component (II) is preferably 10 to 25 mass % or more preferably 20 to 25 mass %. Keeping the ratio of the polymer component (II) within the aforementioned range makes it possible to keep the graft rate of the multilayer structure polymer (C) within the stated range even when the monomers of the entire polymer component (II) are to be graft-polymerized with the cross-linked rubber polymer component (I). The ratio of the polymer component (II) can be obtained from the mass ratio of the monomers of the cross-linked rubber polymer component (I) and the monomers of the polymer component (II) and can be obtained specifically through a method described later in the examples.

In addition, keeping the ratio of the polymer component (II) within the aforementioned range makes it possible to control swelling of the multilayer structure polymer (C) caused by the active energy ray-curable adhesive more accurately. This swelling occurs as the active energy ray-curable adhesive permeates into the multilayer structure polymer (C) within the thermoplastic resin composition. In addition, keeping the ratio of the polymer component (II) within the aforementioned range makes is possible to increase the flexibility in the amount of the graft-bonding monomers to be blended into the polymer component (II). In other words, the range of this blending amount can be broadened.

In another aspect, there is no particular limitation on the ratio of the polymer component (II) as long as the graft rate described above can be obtained. By setting the ratio of the polymer component (II) to preferably 10 to 25 mass % or more preferably 15 to 20 mass %, the graft rate can be kept within the aforementioned range with ease.

Keeping the ratio of the polymer component (II) within the aforementioned range makes it possible to keep the graft rate of the multilayer structure polymer (C) within the stated range even when the entire monomer mixture for forming the polymer component (II) is graft-polymerized with the cross-linked rubber polymer component (I). In addition, swelling of the multilayer structure polymer (C) caused by the active energy ray-curable adhesive can be controlled more accurately.

The affinity between the multilayer structure polymer (C) and the active energy ray-curable adhesive conceivably affects the strength of bonding obtained by the adhesive. It is conceivable that, as this affinity is higher, the bonding strength between the molded product or film including the thermoplastic resin composition and the layered product increases.

[Range of Swelling of Multilayer Structure Polymer (C)]

As the thermoplastic resin composition contains the multilayer structure polymer (C), the active energy ray-curable adhesive applied to the molded product or film including the thermoplastic resin composition, or in particular the active energy ray-curable compound therein, permeates more easily into the multilayer structure polymer (C) present in the molded product or film, or in particular present in the vicinity of the bonding surface. It is conceivable that, as this is irradiated with an active energy ray to be cured, an anchoring effect is produced and the adhesiveness improves. In addition, the adhesive or the monomer thereof causes the multilayer structure polymer (C) to swell.

Figure 3:
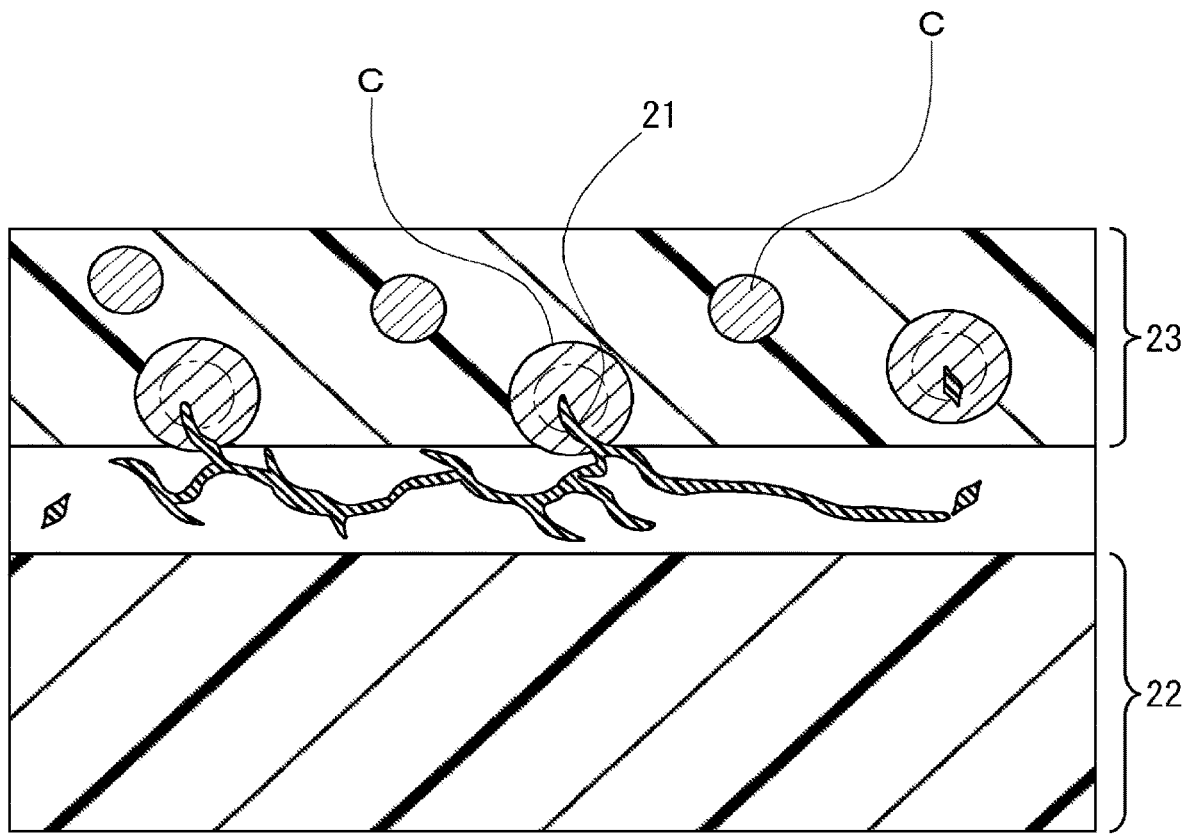
FIG. 3 is an example of a sectional view of a layered product.

An example of the layered product illustrated in FIG. 3 includes an active energy ray-curable adhesive 21, an adherend 22, and a film 23. The film 23 is bonded to the adherend 22 with the active energy ray-curable adhesive 21 provided therebetween. The illustrated film 23 is a film obtained after the adhesive 21 that has permeated into the film is solidified. The drawing is merely schematic and is not intended to limit to a mode in which the adhesive 21 is present in a particulate or string-like form.

The adhesive 21 illustrated in FIG. 3 permeates into the multilayer structure polymer (C) present in the film, or in particular present in the vicinity of the bonding surface of the film. At this time, the multilayer structure polymer (C) swells in some cases. Moderately suppressing the swelling of the multilayer structure polymer (C) illustrated in FIG. 3 makes it possible to retain the transparency of the layered product including the adherend 22 and the film 23 at a favorable level. The range of this swelling can be controlled by the degree of swelling of the multilayer structure polymer (C). As described above, the degree of swelling and the graft rate correlate with each other through the element, namely, the ratio of the polymer component (II). Accordingly, it is preferable to use the following index in controlling the degree of swelling while retaining the graft rate at a suitable level.

[Median Diameter Da]

To obtain the index of swelling of the multilayer structure polymer (C), the multilayer structure polymer (C) is caused to swell with acetone at 25° C. Specifically, the molded product or film including the thermoplastic resin composition is dissolved in acetone of 25° C. Thus, an acetone dispersion of the multilayer structure polymer (C) is obtained. This acetone dispersion is analyzed through a laser diffraction/scattering technique. Thus, a median diameter Da of the multilayer structure polymer (C) is obtained. This median diameter Da represents the mean value of the outer diameter of the multilayer structure polymer (C) that has swollen with acetone.

The median diameter Da is preferably no less than 250 nm nor greater than 450 nm, more preferably no less than 300 nm nor greater than 400 nm, or even more preferably no less than 350 nm nor greater than 400 nm.

It is conceivable that the value of the median diameter Da correlates with the outer diameter of the multilayer structure polymer (C) illustrated in FIG. 3. Therefore, it is conceivable that setting the median diameter Da to no less than 200 nm makes it possible to retain the toughness of the film 23 and the molded product favorably and to increase the permeability of the active energy ray-curable adhesive into the multilayer structure polymer (C) to a sufficient level. In addition, it is conceivable that setting the median diameter Da to less than 500 nm makes it possible to retain the transparency of the film 23 or the molded product favorably even when the film or the molded product is bonded to an adherend with the use of the active energy ray-curable adhesive.

[Manufacture of Multilayer Structure Polymer (C)]

With reference to FIG. 1, a mode of manufacturing the multilayer structure polymer (C) will be described. The multilayer structure polymer (C) is preferably synthesized through emulsion polymerization. First, an emulsifying agent, a pH regulator, a polymerization initiator, monomers (mixture) of the cross-linked rubber polymer component (I), and a chain transfer agent are mixed into water, and thus a polymerization reaction can be carried out. The emulsifying agent may be sodium polyoxyethylene (EO=3) tridecyl ether acetate. Here, EO=3 indicates that the average number of ethylene oxide moles added is 3. The pH regulator may be sodium carbonate. The polymerization initiator may be potassium persulfate. The chain transfer agent may be n-octyl mercaptan. Thus, emulsion containing the cross-linked rubber polymer component (I) can be obtained.

In addition, by adding, to the emulsion, monomers (mixture) of the cross-linked rubber polymer component (I), a polymerization initiator, and a chain transfer agent that are different from those described above, a second instance of polymerization reaction may be carried out. Thus, an inner layer 11 having an inner-side first layer and an outer-side second layer is obtained. Depiction thereof is omitted.

Next, by polymerizing monomers (mixture) of the polymer component (II), the polymer component (II) can be graft-polymerized with the cross-linked rubber polymer component (I). A polymerization reaction can be carried out by adding monomers (mixture) of the polymer component (II), a polymerization initiator, and a chain transfer agent to emulsion. Thus, an outer layer 12 including the polymer component (II) can be formed.

In this manner, emulsion containing the multilayer structure polymer (C) having the multilayer particle structure illustrated in FIG. 1 is obtained. The multilayer structure polymer (C) can be refined from the emulsion through solidification by freezing or washing with water.

[Median Diameter De]

The particle design of the multilayer structure polymer (C) can be optimized on the basis of the median diameter De. Herein, the median diameter De is the mean value of the outer diameter of the multilayer structure polymer (C). This outer diameter is a value measured by diluting the multilayer structure polymer (C) in the emulsion containing the multilayer structure polymer (C) described above to 200 times with water and analyzing the obtained water dispersion through a laser diffraction/scattering technique and can be obtained specifically through a method described later in the examples.

Conceivably, the multilayer structure polymer (C) in the water dispersion described above has no swelling with an adhesive or acetone or has little swelling, if any. A difference between the median diameter Da and the median diameter De is whether swelling is present in the multilayer structure polymer (C). The median diameter Da being greater than the median diameter De indicates that a change in the volume of the multilayer particle structure is large when the multilayer particle structure has swollen.

The ratio [Da/De] of the median diameter Da to the median diameter De preferably falls within the following range.

$$1.1 < [Da/De] \leq 2.0$$

A more preferable range of [Da/De] is as follows.

$$1.3 \leq [Da/De] \leq 1.8$$

An even more preferable range of [Da/De] is as follows.

$$1.3 \leq [Da/De] \leq 1.5$$

In addition, [Da/De] can be any one of 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, and 1.51.

As [Da/De] is greater than 1.1, the permeation rate of the active energy ray-curable adhesive can be increased to a sufficient level. As [Da/De] is no greater than 2.0, swelling of the multilayer structure polymer (C) can be suppressed. Accordingly, whitening of the thermoplastic resin composition can be suppressed. The median diameter De can be measured in accordance with the examples.

The median diameter De is preferably 100 to 350 nm or more preferably 200 to 300 nm. As the median diameter De is no less than 100 nm, the molded product and the film each including the thermoplastic resin composition can have sufficient toughness. As the median diameter De is no greater than 350 nm, the transparency of the thermoplastic resin composition can be increased.

[Manufacture of Thermoplastic Resin Composition]

In an example of the method of manufacturing the thermoplastic resin composition, first, the multilayer structure polymer (C) is obtained. Then, the thermoplastic resin composition is synthesized in the presence of the multilayer structure polymer (C), and thus the thermoplastic resin composition is manufactured. In another example, the multilayer structure polymer (C) and thermoplastic resin are obtained first. Thereafter, the two are mixed together, and the thermoplastic resin composition is manufactured through melt compounding or the like.

[Additive for Thermoplastic Resin Composition]

As a blending agent, a colorant, a fluorescent brightener, a dispersant, a thermostabilizer, a photostabilizer, an infrared absorber, an ultraviolet absorber, an antistatic agent, an antioxidant, a processing aid, a lubricant, or a solvent, may be added to the thermoplastic resin composition as necessary. The colorant may be either of pigment and dye.

The ultraviolet absorber absorbs ultraviolet radiation of no greater than 400 nm. Therefore, the weatherability of the molded product and the film each including the thermoplastic resin composition improves. Examples of the ultraviolet absorber that can be used include well-known ultraviolet absorbers, such as benzophenone-based ultraviolet absorber, benzotriazole-based ultraviolet absorber, and acrylonitrile-based ultraviolet absorber. Among the above, 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, 2,2',4,4'-tetrahydroxybenzophenone, and the like are used suitably. Among the above, 2,2'-methylenebis(4-(1,1,3,3-tetramethylbutyl)-6-(2H-benzotriazole-2-yl)phenol) is particularly preferable.

When the film including the thermoplastic resin composition is used as a protective film of a polarizer, the concentration of the ultraviolet absorber is selected in consideration of the transmittance of light at a wavelength of no greater than 370 nm with respect to the film. The concentration of the ultraviolet absorber can be selected from a range in which this transmittance is preferably no greater than 10%, more preferably no greater than 5%, or even more preferably no greater than 2%. There is no limitation on the method of causing the thermoplastic resin composition to contain the ultraviolet absorber. Examples of the method include a method in which the ultraviolet absorber is blended into the thermoplastic resin or the thermoplastic resin composition in advance and a method in which the ultraviolet absorber is directly supplied at the time of melt-extrusion molding of the thermoplastic resin composition.

Examples of the infrared absorber include compounds, such as a nitroso compound, a metal complex salt thereof, a cyanine-based compound, a squarylium-based compound, a thiol-nickel complex salt-based compound, a phthalocyanine-based compound, a naphthalocyanine-based compound, a triallyl methane-based compound, an imonium-based compound, a diimonium-based compound, a naphthoquinone-based compound, an anthraquinone-based compound, an amino compound, an aminium salt-based compound, carbon black, indium tin oxide, antimony tin oxide, oxides of metals belonging to groups 4A, 5A or 6A of the periodic table, carbide, and boride. For these infrared absorbers, ones that can absorb the entire infrared radiation are preferably selected. The wavelength of the entire infrared radiation is included in the range of approximately 800 nm to 1,100 nm. To absorb the entire infrared radiation, it is also preferable to use two or more of the infrared absorbers in combination. When the film is used as a protective film of a polarizer, the amount of the added infrared absorber may be adjusted so that the transmittance of a light ray at a wavelength of no less than 800 nm with respect to the film is no greater than 10%.

[Molding of Thermoplastic Resin Composition]

The thermoplastic resin composition according to the present disclosure can be molded with the use of a well-known method, such as a T-die method, an inflation method, a contour-extrusion method, a melt-casting method, a calendar method, or an injection-molding method, and can be molded into a molded product or a film. A method of molding the thermoplastic resin composition according to the present disclosure is illustrated with a film, which is a particularly preferable mode of the molded product of the thermoplastic resin composition according to the present disclosure, serving as an example.

The film according to the present disclosure is preferably obtained by molding the thermoplastic resin composition through a T-die method. In the T-die method, a melt-compounded product of the thermoplastic resin composition and so on is extruded from a T-die in a molten state. The film is preferably molded by bringing surfaces of a mirror-finish roll or a mirror-finish belt into contact with two surfaces of the extruded thermoplastic resin composition. With this method, a film having high surface smoothness and low haze is obtained.

The mirror-finish roll and the mirror-finish belt described above are both preferably made of metal. The extruded melt-compounded product is preferably sandwiched by the mirror-finish roll or the mirror-finish belt with the two surfaces of the extruded melt-compounded product being pressed by the mirror-finish roll or the minor-finish belt. The higher this sandwiching pressure is, the more preferable. When this pressure is expressed in a linear pressure, the pressure is preferably no less than 10 N/mm or more preferably no less than 30 N/mm.

In the T-die method, an extruder-type melt-extruding device or the like provided with a single or twin extruding screw can be used. The melt-extruding temperature in the melt-extruding device is preferably 200 to 300° C. or more preferably 220 to 270° C. When such a device is used, the thermoplastic resin composition is melt-compounded preferably under a reduced pressure. A vent is used to reduce the pressure. In addition, it is also preferable to carry out the melt extrusion in a nitrogen stream. With these methods, unintended coloring of the film can be suppressed.

It is preferable to set the temperature of the surface of the mirror-finish roll or the mirror-finish belt to no less than 60° C. at at least one of two surfaces of the extruded melt-compounded product. Furthermore, it is preferable to set the temperature of the surfaces of the mirror-finish roll or the mirror-finish belt to no greater than 130° C. at the two surfaces of the extruded melt-compounded product. Thus, a film having high surface smoothness, high surface glossiness, and low haze is obtained.

Setting the temperature of the surfaces of the mirror-finish roll or the mirror-finish belt to no less than 60° C. as described above makes it possible to increase the surface smoothness of the film and to reduce haze. Setting the temperature of the surfaces of the mirror-finish roll or the mirror-finish belt to no greater than 130° C. as described above makes it possible to relieve the tight bonding of the mirror-finish roll or the mirror-finish belt onto the melt-compounded product. This can suppress roughening of the surfaces of the film that could arise when the molded film is peeled off the mirror-finish roll or the mirror-finish belt. Accordingly, the surface smoothness of the film can be increased, and the haze can be reduced.

The film molded as described above can serve as an original film for stretching and be processed into a biaxially stretched film by biaxially stretching the film in the lengthwise direction and the widthwise direction.

[Layer Configuration of Film]

The film is a monolayer or multilayer film having one, two, three, four, or more layers. When the film is a multilayer film, at least one layer includes the thermoplastic resin composition described above. There is no limitation on the composition of the other layers. The other layers may or may not include the multilayer structure polymer (C).

Figure 4:
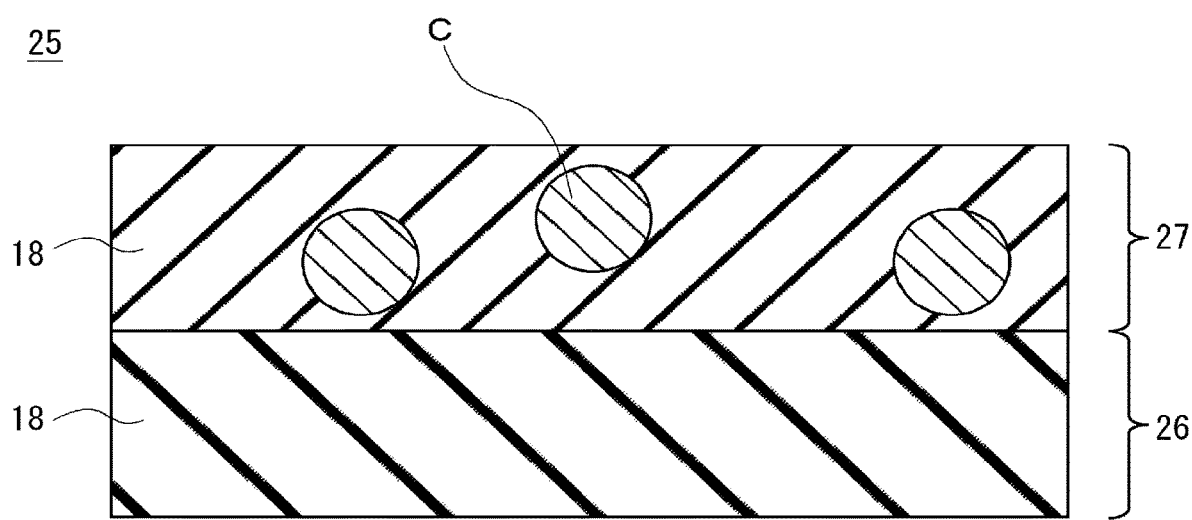
FIG. 4 is an example of a sectional view of a double-layer film.

An example of a double-layer film 25 illustrated in FIG. 4 includes a layer 26 and another layer 27 laminated on the layer 26. The layer 26 does not include any multilayer structure polymer. The layer 27 includes the multilayer structure polymer (C).

When the film is affixed to an adherend, the film may be affixed to the adherend such that the layer including the thermoplastic resin composition according to the present disclosure opposes the adherend. Affixing them together in this manner makes it possible to achieve firm bonding in a short period of time in particular in a case in which the active energy ray-curable adhesive is used.

[Thickness of Film]

The thickness of the film is not particularly limited and is preferably in a range of 10 to 1,000 μm, more preferably in a range of 10 to 300 μm, yet more preferably in a range of 10 to 100 μm, even more preferably in a range of 20 to 80 μm, or particularly preferably in a range of 40 to 80 μm. When the film is a multilayer film, the layer including the multilayer structure polymer (C) desirably has a thickness that is 20 to 80% of the thickness of the entire film. When there are a plurality of layers that include the multilayer structure polymer (C), the total thicknesses of these layers is desirably 20 to 80% of the thickness of the entire multilayer film.

[Heat Resistance of Film]

The range of the dimensional change on heating of the film is preferably −2.0 to 2.0%, more preferably −1.0 to 1.0%, even more preferably −0.8 to 0.8%, or particularly preferably −0.6 to 0.6%. The dimensional change on heating of the film is the rate of an irreversible change in the length of the film arising when the film is heated for 30 minutes at 100° C., expressed with the length of the unheated film taken as 100%. A positive value of the dimensional change on heating indicates that the film has shrunk. A negative value of the dimensional change on heating indicates that the film has expanded. The dimensional change on heating can be measured through a method described in JIS K 7133 (ISO 11501) and can be obtained specifically through a method described later in the examples. In the present specification, the dimensional change on heating being small means that the absolute value of the dimensional change on heating is small. As the dimensional change on heating is within the stated range, warping is less likely to occur in a layered product including the thermoplastic resin film and the adherend even when the layered product is heated.

[Moisture Permeability of Film]

When a multilayer film is used to protect a polarizer, the moisture permeability of the film is preferably no less than 10 g·m$^{-2}$·day$^{-1}$ nor greater than 200 g·m$^{-2}$·day$^{-1}$. With such moisture permeability, the adhesiveness between the layers can be improved. The moisture permeability is a moisture permeability obtained when the film is left to stand for 24 hours under the environment where the relative humidity (RH) is 92% at 40° C. This can be measured through a dish method described in JIS Z0208.

[Formation of Layered Product]

The molded product and the film each including the thermoplastic resin according to the present disclosure can be bonded to an adherend with an adhesive provided therebetween to form a layered product. An example of the adherend is a polarizer. An example of the layered product is a polarizing plate. The adhesive is preferably an active energy ray-curable adhesive or more preferably an ultraviolet-curable adhesive. The active energy ray-curable adhesive renders drying unnecessary and makes it possible to obtain high bonding strength.

[Active Energy Ray-Curable Adhesive]

The active energy ray-curable adhesive preferably contains little or no solvent. The content of the solvent is preferably 0 to 2 mass %. The content of the solvent in the adhesive can be measured through gas chromatography or the like. The content of the solvent in the adhesive can be regulated by the mixture ratio obtained when the solvent is mixed with other components. Hereinafter, the active energy ray-curable adhesive is referred to as an adhesive in some cases.

Examples of the solvent include aliphatic hydrocarbons, such as n-hexane and cyclohexane; aromatic hydrocarbons, such as toluene and xylene; alcohols, such as methanol, ethanol, propanol, isopropanol, and n-butanol; ketones such as acetone, butanone, methyl ethyl ketone, methyl isobutyl ketone, and cyclohexanone; esters, such as methyl acetate, ethyl acetate, and butyl acetate; cellosolves, such as methyl cellosolve, ethyl cellosolve, and butyl cellosolve; and halogenated hydrocarbons, such as methylene chloride and chloroform.

In addition, the viscosity of the adhesive measured by a type B viscometer at 23° C. is preferably 50 to 2,000 mPa·s. An adhesive having such viscosity excels in coatability. There is no limitation on the adhesive, and a well-known adhesive can be used.

[Primary Component of Adhesive]

The primary component of the adhesive is preferably an active energy ray-curable compound. The adhesive contains the active energy ray-curable compound in more preferably no less than 50 mass %, or yet more preferably no less than 70 mass %, or even more preferably no less than 90 mass %. Examples of this compound include a radically photopolymerizable compound and a cationically photopolymerizable compound. The radically photopolymerizable compound is cured upon radical polymerization through an active energy ray. Examples of this compound include a compound having a functional group such as an acryloyl group, a methacryloyl group, or an allyl group. The cationically photopolymerizable compound is cured upon a photo-cationic reaction through an active energy ray. Examples of this compound include a compound having a functional group such as an epoxy group, an oxetane group, a hydroxyl group, a vinyl ether group, an episulfide group, or an ethyleneimine group. For the adhesive, these active energy ray-curable compounds may each be used alone, or two or more of these active energy ray-curable compounds may be used in combination. Among the above, the active energy ray-curable compound preferably includes a cationically photopolymerizable compound. The cationically photopolymerizable compound can be coupled to a functional group produced at the surface of the molded product or the film through pretreatment such as corona treatment and can improve the adhesiveness between the adhesive and the molded product or the film.

Examples of the radically photopolymerizable compound include hydroxyalkyl acrylate, such as 2-hydroxyethyl acrylate and 2-hydroxypropyl acrylate; hydroxyaryl acrylate, such as 2-hydroxy-3-phenoxypropyl acrylate; acrylic-modified carboxylic acid, such as 2-acryloyloxyethyl succinic acid and 2-acryloyloxyethyl phthalic acid; polyethylene glycol diacrylate, such as triethylene glycol diacrylate and tetraethylene glycol diacrylate; polypropylene glycol diacrylate, such as dipropylene glycol diacrylate and tripropylene glycol diacrylate; as well as polyfunctional acrylate, such as neopentyl glycol diacrylate, 1,6-hexanediol diacrylate, 1,9-nonanediol diacrylate, bisphenol A ethylene oxide-modified diacrylate, bisphenol A propylene oxide-modified diacrylate, dimethylol tricyclodecane diacrylate, trimethylol propane triacrylate, pentaerythritol triacrylate, pentaerythritol tetraacrylate, and dipentaerythritol hexaacrylate; other acrylate, such as epoxy acrylate, urethane acrylate, and acrylic acid benzoic acid-mixed ester of neopentyl glycol; and methacrylates of the above.

Examples of the cationically photopolymerizable compound include bisphenol-type epoxy resin, such as bisphenol A-type epoxy resin and bisphenol F-type epoxy resin; compounds classified as novolac-type epoxy resin, such as phenol novolac-type epoxy resin and cresol novolac-type epoxy resin; aliphatic epoxy resin, alicyclic epoxy resin, heterocyclic-type epoxy resin, polyfunctional epoxy resin, biphenyl-type epoxy resin, glycidyl ether-type epoxy resin, glycidyl ester-type epoxy resin, and glycidyl amine-type epoxy resin; compounds classified as alcohol-type epoxy resin, such as hydrogenated bisphenol A-type epoxy resin; halogenated epoxy resin, such as brominated epoxy resin; compounds having an epoxy group, such as rubber-modified epoxy resin, urethane-modified epoxy resin, epoxidized polybutadiene, epoxidized styrene-butadiene-styrene block copolymer, epoxy group-containing polyester resin, epoxy group-containing polyurethane resin, and epoxy group-containing acrylic resin; and compounds having an oxetanyl group, such as phenoxymethyloxetane, 3,3-bis(methoxymethyl)oxetane, 3,3-bis(phenoxymethyl)oxetane, 3-ethyl-3-(phenoxymethyl)oxetane, 3-ethyl-3-(2-ethylhexyloxymethyl)oxetane, 3-ethyl-3-{[3-(triethoxysilyl)propyoxy]methyl}oxetane, di[1-ethyl(3-oxetanyl)]methyl ether, oxetanyl silsesquioxane, phenol novolac oxetane, and 1,4-bis{[(3-ethyl-3-oxetanyl)methoxy]methyl}benzene. Among the above, the cationically photopolymerizable compound preferably includes bisphenol-type epoxy resin and/or a compound having an oxetanyl group or more preferably includes bisphenol A-type epoxy resin and/or 3-ethyl-3 (phenoxymethyl)oxetane. These compounds can be coupled to a functional group produced at the surface of the molded product or the film through pretreatment such as corona treatment and can improve the adhesiveness between the adhesive and the molded product or the film.

A compound that is a radically photopolymerizable compound and a cationically photopolymerizable compound is referred to as a radical/cationic ampholytic monomer. Examples of the ampholytic monomer include (3-ethyloxetane-3-yl)methyl acrylate. These active energy ray-curable compounds may each be used alone, or a plurality of the active energy ray-curable compounds may be used in combination.

Blending the polymerization initiator into the adhesive makes it possible to increase the efficiency in the curing reaction of the adhesive. The polymerization initiator is selected in accordance with the type of the active energy ray to be used. Examples of the polymerization initiator include radical photopolymerization initiators, such as acetophenone-based, benzophenone-based, thioxanthone-based, benzoin-based, and benzoin alkyl ether-based ones; and cationic photopolymerization initiators, such as an aromatic diazonium salt, an aromatic sulfonium salt, an aromatic iodonium salt, a metallocene compound, and a benzoin sulfonic acid ester. Among the above, the cationic photopolymerization initiator is preferable, and the aromatic sulfonium salt is more preferable. The above can each be used alone, or two or more of the above can be used in combination.

Examples of the acetophenone-based photopolymerization initiator include 4-phenoxy dichloroacetophenone, 4-tert-butyl-dichloroacetophenone, diethoxyacetophenone, 1-phenyl-2-hydroxy-2-methylpropan-1-one, 1-[4-(2-hydroxyethyl)-phenyl]-2-hydroxy-2-methylpropan-1-one, and 1-hydroxycyclohexyl phenyl ketone.

Examples of the benzoin alkyl ether-based photopolymerization initiator include benzoin methyl ether, benzoin ethyl ether, benzoin propyl ether, benzoin isopropyl ether, and benzoin isobutyl ether.

Examples of the benzophenone-based photopolymerization initiator include benzophenone, benzoylbenzoic acid, 3,3'-dimethyl-4-methoxybenzophenone, polyvinyl benzophenone, and α-hydroxycyclohexyl phenyl ketone.

The cationic photopolymerization initiator can effectively initiate and allow the progress of cationic photopolymerization of the cationically photopolymerizable compound. Therefore, the cationic photopolymerization initiator is preferably activated by light at a wavelength of no less than 300 nm. The cationic photopolymerization initiator may be an ionic photoacid generator or a nonionic photoacid generator.

There is no particular limitation on the ionic photoacid generator. Examples of the photoacid generator include onium salts, such as an aromatic diazonium salt, an aromatic halonium salt, and an aromatic sulfonium salt; organometallic complexes, such as an iron-allene complex, a titanocene complex, and an arylsilanol-aluminum complex; and agents having a bulky counter anion, such as tetrakis(pentafluorophenyl)borate. These ionic photoacid generators may each be used alone, or two or more of these ionic photoacid generators may be used in combination.

Examples of the above-described ionic photoacid generator that may be used include the "Adeka Optomer" series including those with the product names "Adeka Optomer SP 150" and "Adeka Optomer SP 170" manufactured by Asahi Denka Co., Ltd., one with the product name "UVE-1014" manufactured by General Electronic Company, one with the product name "CD-1012" manufactured by Sartomer Company Inc., and one with the product name "Photoinitiator 2074" manufactured by Rhodia Inc.

There is no particular limitation on the nonionic photoacid generator. Examples thereof include a nitrobenzyl ester, a sulfonic acid derivative, a phosphate ester, a phenol sulfonic acid ester, diazonaphthoquinone, and N-hydroxyimidophosphonate. These nonionic photoacid generators may each be used alone, or two or more of these nonionic photoacid generators may be used in combination.

The preferable amount by which the polymerization initiator is blended is 0.5 to 20 parts by mass of the polymerization initiator with respect to 100 parts by mass of the active energy ray-curable compound. This blending amount is preferably no less than 1 part by mass and preferably no greater than 10 parts by mass. When the active energy ray-curable compound is epoxy resin, setting the blending amount to no less than 0.5 parts by mass makes it possible to cure the adhesive at a sufficient level. Accordingly, the mechanical strength of the layered product and the bonding strength between the film and the adherend can be increased. When the polymerization initiator is ionic, setting the blending amount to no greater than 20 parts by mass allows for an increase in the content of the ionic substance in the cured adhesive. Accordingly, a decrease in the durability of the adhesive can be suppressed.

[Additive for Adhesive]

Furthermore, a photosensitizer, an antistatic agent, an infrared absorber, an ultraviolet absorber, an antioxidant, organic-based fine particles, inorganic oxide-based fine particles, metal powder, pigment, dye, and the like may be added to the adhesive.

The photosensitizer improves the reactivity of the adhesive. The photosensitizer improves the mechanical strength and the bonding strength of the cured adhesive. There is no particular limitation on the photosensitizer. Examples of the photosensitizer include a carbonyl compound, an organic sulfur compound, persulfide, a redox-based compound, an azo compound, a diazo compound, a halogen compound, and photoreductive dyestuff.

Specific examples of the photosensitizer include benzoin derivatives, such as benzoin methyl ether, benzoin isopropyl ether, and α,α-dimethoxy-α-phenylacetophenone; benzophenone derivatives, such as benzophenone, 2,4-dichlorobenzophenone, methyl o-benzoylbenzoate, 4,4'-bis(dimethylamino)benzophenone, and 4,4'-bis(diethylamino) benzophenone; thioxanthone derivatives, such as 2-chlorothioxanthone and 2-isopropylthioxanthone; anthraquinone derivatives, such as 2-chloroanthraquinone and 2-methylanthraquinone; acridone derivatives, such as N-methylacridone and N-butylacridone; as well as α,α-diethoxyacetophenone, benzyl, fluorenone, xanthone, a uranyl compound, and a halogen compound, but these are not limiting examples. The above may each be used alone or may be used upon being mixed with one another.

The range of the amount by which the photosensitizer is added is preferably 0.1 to 20 parts by mass or more preferably 0.1 to 5.0 parts by mass with respect to 100 parts by mass of the active energy ray-curable compound.

[Curing Condition by Active Energy Ray]

Examples of the active energy ray include microwave, infrared radiation, visible light, ultraviolet radiation, X-rays, and γ-rays. Ultraviolet radiation is preferable for its ease of handling, in particular. Among these electromagnetic waves, ultraviolet radiation is one of the electromagnetic waves that allows for obtaining high energy. The adhesive can be cured efficiently with ultraviolet radiation.

There is no particular limitation on the light source to be used to emit the active energy ray. When ultraviolet radiation serves as a preferable example of the active energy ray, examples of the light source include a low-pressure mercury lamp, a medium-pressure mercury lamp, a high-pressure mercury lamp, an ultrahigh-pressure mercury lamp, a chemical lamp, a blacklight lamp, a microwave-excited mercury lamp, and a metal halide lamp.

There is no particular limitation on the irradiation intensity of the active energy ray. It is preferable to set the irradiation intensity of the light in a wavelength range, within the active energy ray, that is effective in activating the polymerization initiator to 0.1 to 100 mW/cm$^2$. Setting this irradiation intensity to no less 0.1 mW/cm$^2$ makes it possible to keep the reaction time from being extended. Setting this irradiation intensity to no greater than 100 mW/cm$^2$ makes it possible to keep the radiant heat of the light source from being radiated to the adhesive in a short period of time. In addition, an occurrence of polymerization reaction heat in the adhesive within a short period of time can be suppressed. Thus, yellowing of the cured adhesive can be suppressed. In addition, any deterioration of the adherend, represented by a polarizer, can be suppressed as well.

The irradiation time of the active energy ray can be selected as appropriate in accordance with the irradiation intensity. In the present embodiment, the cumulative quantity of light is expressed by the product of the irradiation intensity and the irradiation time described above. The cumulative quantity of light is preferably 10 to 5,000 mJ/cm$^2$, more preferably 50 to 2,000 mJ/cm$^2$, or even more preferably 100 to 1,000 mJ/cm$^2$. Setting the cumulative quantity of light within the stated range allows for obtaining a layered product with less deterioration in the thermoplastic resin or the adhesive and with sufficient bonding strength.

[Polarizing Plate]

The film according to the present disclosure can be used as a protective film of a polarizer. By affixing the film to at least one of the surfaces of the polarizer, which serves as an adherend, this surface can be protected. In the present specification, a polarizer to which the film has been affixed is referred to as a polarizing plate. The film is affixed to the polarizer with the active energy ray-curable adhesive provided therebetween. The following method can be applied also to adherends other than the polarizer.

A polarizing plate is formed by laminating the film on at least one of the surfaces of the polarizer. The film may be laminated on each of the two surfaces of the polarizer. The film described above may be laminated on one of the surfaces of the polarizer, and another protective film for a polarizer may be laminated on the other surface. No protective film for a polarizer needs to be laminated on the other surface.

[Polarizer]

A commercially available polarizer may be used, and one composed of polyvinyl alcohol (PVA)-based resin is preferable. The polyvinyl alcohol-based resin can be obtained by saponifying polyvinyl acetate-based resin. Examples of the polyvinyl acetate-based resin include polyvinyl acetate, which is a homopolymer of vinyl acetate. Another example is a copolymer of vinyl acetate and another monomer that can be copolymerized with vinyl acetate. Examples of the other monomer include unsaturated carboxylic acids, unsaturated sulfonic acids, olefins, vinyl ethers, and acrylamides having an ammonium group.

The thickness of the polarizer is in a range of preferably 5 to 40 μm or more preferably 10 to 35 μm.

[Bonding]

There is no limitation on the method of coating the polarizer with the adhesive. For example, various coating devices such as a doctor blade, a wire bar, a die coater, a comma coater, and a gravure coater can be used. Prior to affixing the film to the polarizer, the surface of the polarizer may be subjected to high-adhesion treatment, such as saponification treatment, corona treatment, primer treatment, or anchor coating treatment.

[Application of Molded Product And Film]

The molded product and the film each including the thermoplastic resin composition according to the present disclosure find use also in applications aside from being used as a protective film of a polarizer. There is no particular limitation on such applications. Examples thereof include vehicular decorative components for vehicle exteriors, vehicle interiors, and so on; construction material components, such as wall materials, window films, and bathroom wall materials; daily goods, such as tableware, musical instruments, and toys; home appliance decorative components, such as vacuum cleaner housings, television housings, and air conditioner housings; interior members, such as kitchen door covering materials; shipping members; electronic communication equipment components, such as covering materials for various displays, covering materials for touchpads, personal computer housings, and mobile phone housings; optics-related components, such as liquid-crystal protective plates, light guide plates, light guide films, polarizer protective films, polarizing plate protective films, retardation films, front plates of various displays, and diffusers;

and photovoltaic generator equipment components, such as covering materials for solar cells or photovoltaic power generating panels.

[Application of Polarizing Plate]

The polarizing plate is obtained by bonding the film described above to a polarizer. The polarizing plate can be used upon being embedded into an image display device. Examples of the image display device include a liquid-crystal display (LCD), a cathode-ray tube display device (CRT), a plasma display (PDP), an electroluminescent display (ELD), a field-emission display (FED), a touchpad, a tablet PC, an electronic paper, and a head-up display (HUD).

The polarizing plate described above excels in heat resistance in a high-humidity environment. This polarizing plate is suitable for a liquid-crystal display used in a high-humidity, high-temperature use environment. This liquid-crystal display can be used, for example, as a large-screen television, a car navigation system, a smartphone, a tablet or mobile personal computer, and a wearable display.

EXAMPLES

Hereinafter, the present disclosure will be described in more concrete terms by illustrating example and comparative examples. It is to be noted that the present disclosure is not limited by the following examples. In addition, the present disclosure encompasses all the aspects conceived by combining, as desired, the matters expressing the technical features such as characteristic values, modes, production methods, and applications described in the foregoing embodiments and the following examples.

The physical properties in the examples and the comparative examples were measured through the following methods. The abbreviations of the monomers and so on used in the examples and the comparative examples are as follows.

MMA: methyl methacrylate
ALMA: allyl methacrylate
MA: methyl acrylate
BA: n-butyl acrylate
t-BA: tert-butyl acrylate
BzA: benzyl acrylate
CHA: cyclohexyl acrylate
THFA: tetrahydrofurfuryl acrylate
St: styrene
n-OM: n-octyl mercaptan

[Number-Average Molecular Weight (Mn) and Formula Weight (Fn)]

The number-average molecular weights (Mn) of the methacryl-based polymer (A) and the acryl-based copolymer (B) held during polymerization and at the end of polymerization and the number average (Fn) of the formula weight of the polymer component (II), namely, the number-average molecular weight of a polymer sample having a composition that is the same as the composition of the polymer component (II) were obtained as a polystyrene-equivalent molecular weight on the basis of the values measured with the use of GPC (gel permeation chromatography). The measurement conditions were as follows.

Device: GPC device "HLC-8320" manufactured by Tosoh Corporation
Separating Column: one in which "TSKguardcolum SuperHZ-H," "TSKgel HZM-M," and "TSKgel SuperHZ4000" manufactured by Tosoh Corporation were coupled in series
Eluant: tetrahydrofuran
Flow Rate of Eluant: 0.35 ml/min
Column Temperature: 40° C.
Detecting Method: refractive index (RI) method

[Measurement of Triad Syndiotacticity (rr)]

With the methacryl-based polymer (A) obtained in the manufacturing example serving as a sample, $^1$H-NMR measurement was carried out. In a case in which another resin is included in the thermoplastic resin including the methacryl-based polymer (A), the methacryl-based polymer (A) was extracted from the thermoplastic resin, and the extracted methacryl-based polymer (A) was subjected to $^1$H-NMR measurement.

With the value indicated by tetramethylsilane (TMS) serving as a reference for 0 ppm, the area (X) of a region spanning from 0.6 to 0.95 ppm and the area (Y) of a region spanning from 0.6 to 1.35 ppm were measured. The value calculated on the basis of the expression: (X/Y)×100 was set as the triad syndiotacticity (rr) (%). The measurement conditions were as follows.

Device: nuclear magnetic resonance device (ULTRA SHIELD 400 PLUS manufactured by Bruker Corporation)
Solvent: deuteriochloroform
Measured Nuclide: $^1$H
Measurement Temperature: room temperature (25° C.)
Cumulative Frequency: 64

[Measurement of Glass Transition Temperature (Tg [° C.])]

The glass transition temperature (Tg [° C.]) was measured in accordance with JIS K7121. A differential scanning calorimetry (DSC) device was used for the measurement (DSC-50 manufactured by Shimadzu Corporation). In measuring the DSC curve, the following condition was used. Specifically, the temperature of the sample was once raised to 230° C., and the sample was then cooled to 25° C. Thereafter, the temperature was raised from 25° C. to 230° C. at a rate of 10° C./min. An intermediate glass transition temperature was obtained from the DSC curve measured in the second instance of the temperature increase. This intermediate glass transition temperature served as the glass transition temperature (Tg [° C.]).

[Calculation of Ratio of Polymer Component (II)]

The ratio (mass %) of the polymer component (II) was calculated from the mass ratio of the monomers of the cross-linked rubber polymer component (I) and the monomers of the polymer component (II) through the following expression.

(ratio of polymer component (II)) (mass %)={(mass ratio of polymer component (II))/[(mass ratio of cross-linked rubber polymer component (I))+ (mass ratio of polymer component (II))]}×100

[Measurement of Graft Rate of Multilayer Structure Polymer (C)]

Powder of the multilayer structure polymer (C) was precisely weighted to 2 g, and this served as the sample mass (W) This powder was immersed in 118 g of acetone at 25° C. for 24 hours. Thereafter, the powder and acetone were stirred to uniformly disperse the multilayer structure polymer (C) in acetone. Thus, a preparation was produced.

Thereafter, 30 g of the preparation was sampled into each of four stainless-steel centrifuge tubes. The centrifuge tubes were weighted in advance. The centrifuge tubes were subjected to centrifugation at 0° C. for 60 minutes at 20,000 rpm with a high-speed refrigerated centrifuge (CR22GIII manufactured by Hitachi, Ltd.).A supernatant liquid was removed from each of the centrifuge tubes through decantation. Thereafter, 30 g of acetone was newly placed into each of the centrifuge tubes. A precipitate and acetone were stirred. After the centrifuge tubes were subjected to centrifugation again, a supernatant liquid was removed. Stirring, centrifugal separation, and supernate removal were repeated for a total of four times. Thus, an acetone-soluble component was removed to a sufficient level.

Thereafter, the precipitate was dried by vacuum-drying the precipitate along with the centrifuge tubes. The precipitate was weighted after being dried to obtain the mass of the acetone-insoluble component. The graft rate of the multilayer structure polymer (C) was calculated through the following expression.

(graft rate)={[(mass of acetone-insoluble component)−(mass of cross-linked rubber polymer component (I))]/(mass of cross-linked rubber polymer component (I))}×100

Herein, the mass of the cross-linked rubber polymer component (I) is the total mass of the monomers used to synthesize the cross-linked rubber polymer component (I) included in the sample mass (W).

[Measurement of Median Diameter De]

The multilayer structure polymer (C) was produced through emulsion polymerization as follows. The emulsion obtained after the emulsion polymerization was diluted to 200 times with water. This water dispersion was analyzed with a laser diffraction/scattering particle size distribution measuring device (LA-950V2 manufactured by HORIBA, Ltd.). The median diameter De was calculated from the analyzed value. In this case, the absolute refractive indices of the multilayer structure polymer (C) and the water were 1.4900 and 1.3333, respectively.

[Measurement of Median Diameter Da]

0.2 g of a film including the thermoplastic resin composition produced as described below was immersed in 10 g of acetone. The film was left to stand for 24 hours at 25° C., and thus an acetone dispersion of the multilayer structure polymer (C) was obtained. This dispersion was analyzed with the laser diffraction/scattering particle size distribution measuring device (LA-950V2 manufactured by HORIBA, Ltd.), and the median diameter Da was calculated from the analyzed value. In this case, the absolute refractive indices of the multilayer structure polymer (C) and acetone were 1.4900 and 1.3591, respectively.

[Dimensional Change on Heating]

A test piece (100 mm in length by 100 mm in width) was cut out from the film including the thermoplastic resin composition. A straight line with a length of 70 mm was drawn at the center of the test piece with a permanent marker. This straight line was drawn parallel to the lengthwise direction (machine direction) of the original film with the original film from which the test piece has not been cut out serving as a reference. The test piece was heated for 30 minutes in a forced hot-air circulating constant-temperature oven retained at a temperature of 100° C. Thereafter, the length L (mm) of the drawn straight line was measured, and the dimensional change on heating was obtained through the following expression.

dimensional change on heating (%)=(70−L)/70×100

[Adhesiveness by Active Energy Ray-curable Adhesive]

The adhesiveness between the protective film composed of the film including the thermoplastic resin composition and a polarizing film was evaluated as follows. At 25° C., one surface of the thermoplastic resin film, serving as the protective film, was coated with the active energy ray-curable adhesive to the thickness of 2 μm. The polarizing film was affixed onto the adhesive. When 10 seconds had passed after the affixation, the adhesive interposed between the protective film and the polarizing film was cured through ultraviolet irradiation. The cumulative quantity of light was 700 mJ/cm$^2$. This cumulative quantity of light was measured with the use of a UV meter (manufactured by GS YUASA Corporation).

After the irradiation with the ultraviolet radiation, 10 samples were randomly cut out from the layered product obtained upon being left to stand for 24 hours at 23° C. with a relative humidity of 50%. The dimensions of the samples were 50 mm in length by 25 mm in width. A slit was made by a cutter at a portion of an adhesive layer on the film superposed later, and the samples were peeled manually to be separated into the films including the thermoplastic resin composition according to the present disclosure and the polarizing films. The examples and the comparative examples were classified in the following A to C, and the adhesiveness thereof was thus evaluated.

A: The bonding strength was high, either film was damaged in every sample, and the polarizing film and the protective film could not be separated from each other in any of the samples.

B: Either one of the films was damaged in nine out of ten samples. In other words, a material rupture occurred. Neither of the films was damaged in one sample, and the two films were able to be separated with the adhesive layer serving as an interface. In other words, interface peeling was achieved.

C: The number of samples in which a material rupture occurred was no greater than eight. The interface peeling was achieved in no less than two samples. The comparative examples in which the two films were able to be separated in every sample are also classified into this.

[Suppressing Whitening of Layered Product]

An appearance of samples equivalent to the ten samples produced in the evaluation of the adhesiveness was observed. The degree by which the whitening of the samples was suppressed was evaluated in the following standards A to C.

A: Whitening was not observed in any of the ten samples.

B: Whitening was observed in one of the ten samples. No whitening was observed in the other samples.

C: Whitening was observed in two or more of the ten samples.

Manufacturing Example 1

Methacryl-Based Polymer (A)

The air inside an autoclave provided with a stirrer and a thief tube was replaced with nitrogen. The autoclave was charged with 100 parts by mass of refined methyl methacrylate, 0.0074 parts by mass of 2,2'-azobis(2-methylpropionitrile), and 0.20 parts by mass of n-octyl mercaptan. The hydrogen abstraction capacity of 2,2'-azobis(2-methylpropionitrile) was 1%. The one-hour half-life period temperature of this compound was 83° C. These compounds were stirred with the stirrer to obtain a starting liquid. Nitrogen was further fed into the starting liquid, and dissolved oxygen in the starting liquid was removed.

In the following, the starting liquid was supplied to a tank reactor connected to the autoclave via the thief tube. The starting liquid was transferred to fill no greater than ⅔ in volume of the tank reactor. While the temperature of the starting liquid was retained at 140° C., a polymerization reaction was carried out in a batch system in the tank reactor, and a reaction liquid was obtained. When the polymerization conversion rate of the reaction liquid had reached 55 mass %, the additional starting liquid started being supplied to the tank reactor from the autoclave. At this point, the flow rate of the supplied starting liquid was regulated, and the reaction liquid was discharged from the tank reactor at a flow rate that is the same as the flow rate of the supplied starting liquid. Thus, the average residence time of the liquid in the tank reactor was adjusted to 150 minutes. In this manner, the polymerization reaction in a batch system was switched to a polymerization reaction in a continuous flow system while the temperature inside the tank reactor was retained at 140° C. After the switching, the polymerization conversion rate in a steady state was 52 mass %.

The reaction liquid discharged from the tank reactor in the steady state was supplied to and heated in a multi-tube heat exchanger at an inner temperature of 230° C. The flow rate was regulated so that the average residence time inside the multi-tube heat exchanger was two minutes. Thereafter, the heated reaction liquid was introduced into a flash evaporator. Volatile matter, in the reaction liquid, having an unreacted monomer as a primary component was removed to obtain molten resin. The molten resin having the volatile matter removed therefrom was supplied to a vented twin screw extruder. The inner temperature of the vented twin screw extruder was 260° C. The diameter was 41 mm. The molten resin was discharged into strands from the vented twin screw extruder. The molten resin strands were cut with a pelletizer to obtain the methacryl-based polymer (A) in a pellet form. The number-average molecular weight (Mn) was 58,000. The syndiotacticity (rr) was 51%. The glass transition temperature was 120° C. The content of the structural unit derived from methyl methacrylate was 100 mass %.

Manufacturing Example 2

Acryl-Based Copolymer (B)

A reactor provided with a stirrer, a thermometer, a nitrogen gas introducing tube, a monomer introducing tube, and a reflux condenser was used. Inside the reactor was put into a nitrogen atmosphere. This reactor was charged with 2,700 parts by mass of ion-exchanged water. Furthermore, the reactor was charged with 1.8 parts by mass of sodium polyoxyethylene (EO=3) tridecyl ether acetate (with the product name Nikkol ECT-3NEX manufactured by Nikko Chemicals Co., Ltd.) and 2.1 parts by mass of sodium carbonate. These were stirred to be dissolved and mixed, and thus an aqueous medium with pH=8 was obtained. The temperature of the aqueous medium was raised to target at 75° C.

Aside from the above, 2,000 parts by mass of a monomer mixture composed of 92 mass % of methyl methacrylate, 7 mass % of methyl acrylate, 1 mass % of benzyl acrylate, and 0.42 mass % of n-octyl mercaptan and 4.5 parts by mass of sodium polyoxyethylene (EO=3) tridecyl ether acetate were weighted into a predetermined vessel. These were mixed and dissolved in a beaker to prepare a monomer mixture having an emulsifying agent added thereto.

Upon the temperature of the aqueous medium in the reactor having reached 75° C., 1.8 parts by mass of potassium persulfate was placed into the reactor. Thereafter, the monomer mixture described above was continuously supplied at a rate of 1.43 mass %/min to carry out a polymerization reaction. Herein, the total amount of the monomer mixture was 100 mass %. Upon the entire amount of the monomer mixture having finished being supplied, the polymerization reaction was completed by retaining the aqueous medium at 75° C. for 60 minutes while stirring. After the completion of the polymerization, the polymerization reactant was cooled to 40° C. and filtered with a 325-mesh wire gauze to obtain emulsion of the polymer. The obtained emulsion was solidified through freezing solidification, the solidified polymer was washed, filtered, and dried to obtain the acryl-based copolymer (B). This acryl-based copolymer (B) had a glass transition temperature of 108° C. and a number-average molecular weight of 38,000.

In Manufacturing Examples 3 to 9, multilayer structure polymers (C1) to (C7) were synthesized to serve as examples of the multilayer structure polymer (C).

Manufacturing Example 3

Multilayer Structure Polymer (C1)

(1) A reactor provided with a stirrer, a thermometer, a nitrogen gas introducing tube, a monomer introducing tube, and a reflux condenser was prepared. This reaction vessel was charged with 1,050 parts by mass of ion-exchanged water, 0.13 parts by mass of sodium polyoxyethylene (EO=3) tridecyl ether acetate, and 0.7 parts by mass of sodium carbonate. The interior of the reactor was replaced sufficiently with a nitrogen gas. Thereafter, the inner temperature was set to 80° C. The reaction vessel was further charged with 0.25 parts by mass of potassium persulfate. These source materials were stirred for five minutes.

Separately, 245 parts by mass of a monomer mixture having the composition of the first layer under the component (I) shown in Table 1 was prepared. Into this monomer mixture, 0.84 parts by mass of sodium polyoxyethylene (EO=3) tridecyl ether acetate, serving as an emulsifying agent, was dissolved to prepare a first layer source material. This first layer source material was continuously added dropwise to the stirred source material over a period of 60 minutes. After the dropwise addition, the polymerization reaction was carried out for another 30 minutes. Thus, emulsion including the polymer component of the first layer was obtained.

(2) Thereafter, this same reactor was charged with 0.32 parts by mass of potassium persulfate. The emulsion was stirred for five minutes. Separately, 315 parts by mass of a monomer mixture having the composition of the second layer under the component (I) shown in Table 1 was prepared. Into this monomer mixture, 0.82 parts by mass of sodium polyoxyethylene (EO=3) tridecyl ether acetate, serving as an emulsifying agent, was dissolved to prepare a second layer source material. The second layer source material was continuously added dropwise to the stirred emulsion described above over a period of 60 minutes to obtain the cross-linked rubber polymer component (I). Thus, emulsion including the cross-linked rubber polymer component (I) was obtained.

(3) Then, this same reactor was charged with 0.14 parts by mass of potassium persulfate. The emulsion was stirred for five minutes. Separately, 140 parts by mass of a monomer mixture having the composition of the component (II) shown in Table 1 was prepared. This monomer mixture includes a chain transfer agent n-octyl mercaptan, as shown in Table 1. This monomer mixture was continuously added dropwise to the stirred emulsion over a period of 30 minutes. After the dropwise addition, the polymerization reaction was carried out for another 60 minutes. Thus, the polymer component (II) that was graft-polymerized with the cross-linked rubber polymer component (I) was synthesized.

Through the foregoing operation, emulsion including the multilayer structure polymer (C1) was obtained. This emulsion was frozen to solidify the multilayer structure polymer (C1). Thereafter, the solidified product was washed with water and dried to obtain powder of the multilayer structure polymer (C1).

[Supplement to Manufacturing Example 3] Estimation of Number Average of Formula Weight of Polymer Component (II)

Separately, a reactor equivalent to the reactor described above was prepared. This reactor was charged with 1,050 parts by mass of ion-exchanged water, 0.35 parts by mass of sodium polyoxyethylene (EO=3) tridecyl ether acetate, and 0.7 parts by mass of sodium carbonate. The interior of the reactor was replaced sufficiently with a nitrogen gas. The inner temperature of the reactor was set to 80° C. The reactor was further charged with 0.14 parts by mass of potassium persulfate. These source materials were stirred for five minutes.

Separately, 140 parts by mass of a monomer mixture having the composition of the component (II) shown in Table 1 was prepared. This monomer mixture was placed into the aforementioned reactor to allow for homopolymerization of the monomer mixture. Thus, a homopolymer composed of the same structural units as the polymer component (II) was synthesized. In addition, emulsion including this homopolymer was obtained. The emulsion was frozen to solidify the homopolymer. Thereafter, the solidified product was washed with water and dried to obtain the homopolymer. The number-average molecular weight of this homopolymer is shown in Table 1 as an estimated value of the number average (Fn) of the formula weight of the polymer component (II). The above applies similarly in Manufacturing Examples 4 to 9.

Manufacturing Example 4

Multilayer Structure Polymer (C2)

(1) A reactor provided with a stirrer, a thermometer, a nitrogen gas introducing tube, a monomer introducing tube, and a reflux condenser was prepared. This reaction vessel was charged with 1,050 parts by mass of ion-exchanged water, 0.53 parts by mass of sodium polyoxyethylene (EO=3) tridecyl ether acetate, and 0.7 parts by mass of sodium carbonate. The interior of the reactor was replaced sufficiently with a nitrogen gas. Thereafter, the inner temperature was set to 80° C. The reaction vessel was further charged with 0.25 parts by mass of potassium persulfate. These source materials were stirred for five minutes.

Separately, 245 parts by mass of a monomer mixture having the composition of the first layer under the component (I) shown in Table 1 was prepared. Into this monomer mixture, 0.84 parts by mass of sodium polyoxyethylene (EO=3) tridecyl ether acetate, serving as an emulsifying agent, was dissolved to prepare a first layer source material. This first layer source material was continuously added dropwise to the stirred source material described above over a period of 60 minutes. After the dropwise addition, the polymerization reaction was carried out for another 30 minutes. Thus, emulsion including the polymer component of the first layer was obtained.

(2) Thereafter, this same reactor was charged with 0.32 parts by mass of potassium persulfate. The emulsion was stirred for five minutes. Separately, 315 parts by mass of a monomer mixture having the composition of the second layer under the component (I) shown in Table 1 was prepared. Into this monomer mixture, 0.82 parts by mass of sodium polyoxyethylene (EO=3) tridecyl ether acetate, serving as an emulsifying agent, was dissolved to prepare a second layer source material. The second layer source material was continuously added dropwise to the stirred emulsion described above over a period of 60 minutes to obtain the cross-linked rubber polymer component (I). Thus, emulsion including the cross-linked rubber polymer component (I) was obtained.

(3) Then, this same reactor was charged with 0.14 parts by mass of potassium persulfate. The emulsion was stirred for five minutes. Separately, 140 parts by mass of a monomer mixture having the composition of the component (II) shown in Table 1 was prepared. This monomer mixture includes a chain transfer agent n-octyl mercaptan, as shown in Table 1. This monomer mixture was continuously added dropwise to the stirred emulsion over a period of 30 minutes. After the dropwise addition, the polymerization reaction was carried out for another 60 minutes. Thus, the polymer component (II) that was graft-polymerized with the cross-linked rubber polymer component (I) was synthesized.

Through the foregoing operation, emulsion including the multilayer structure polymer (C2) was obtained. This emulsion was frozen to solidify the multilayer structure polymer (C2). Thereafter, the solidified product was washed with water and dried to obtain powder of the multilayer structure polymer (C2).

Manufacturing Example 5

Multilayer Structure Polymer (C3)

Powder of the multilayer structure polymer (C3) was obtained through an operation similar to that of Manufacturing Example 3 except in that the compositions of the first layer and the second layer of the component (I) and the composition of the component (II) shown in Table 1 were changed.

Manufacturing Example 6

Multilayer Structure Polymer (C4)

Powder of the multilayer structure polymer (C4) was obtained through an operation similar to that of Manufacturing Example 3 except in that the compositions of the first layer and the second layer of the component (I) and the composition of the component (II) shown in Table 1 were changed.

Manufacturing Example 7

Multilayer Structure Polymer (C5)

(1) A reactor provided with a stirrer, a thermometer, a nitrogen gas introducing tube, a monomer introducing tube, and a reflux condenser was prepared. This reaction vessel was charged with 1,050 parts by mass of ion-exchanged water, 0.10 parts by mass of sodium polyoxyethylene (EO=3) tridecyl ether acetate, and 0.7 parts by mass of sodium carbonate. The interior of the reactor was replaced sufficiently with a nitrogen gas.

Thereafter, powder of the multilayer structure polymer (C5) was obtained through an operation similar to that of Manufacturing Example 3 except in that the compositions of the first layer and the second layer of the component (I) and the composition of the component (II) shown in Table 1 were changed.

Manufacturing Example 8

Multilayer Structure Polymer (C6)

Powder of the multilayer structure polymer (C6) was obtained through an operation similar to that of Manufacturing Example 3 except in that the compositions of the first layer and the second layer of the component (I) and the composition of the component (II) shown in Table 1 were changed.

Manufacturing Example 9

Multilayer Structure Polymer (C7)

Powder of the multilayer structure polymer (C7) was obtained through an operation similar to that of Manufacturing Example 3 except in that the compositions of the first layer and the second layer of the component (I) and the composition of the component (II) shown in Table 1 were changed.

Indicated in the row labeled "Second Layer" is the proportion (parts by mass) of the polymer component in the first layer of the cross-linked rubber polymer component (I) within the multilayer structure polymer (C). Indicated in the rows labeled BA, St, and ALMA are the proportions (mass %) of the respective monomers used to synthesize the polymer component in the second layer.

Indicated in the row labeled Component (II) is the proportion (parts by mass) of the polymer component (II) in the multilayer structure polymer (C). Indicated in the rows labeled MMA MABzA, CHA, THFA, and t-BA are the proportions (mass %) of the respective monomers used to synthesize the polymer component (II). Indicated in n-OM is the proportion (mass %) of the chain transfer agent used to synthesize the polymer component (II).

Indicated in the row labeled Component (II) Ratio is the ratio of the polymer component (II). Diameter De indicates the median diameter De of the multilayer particle structure forming the multilayer structure polymer (C). Graft Rate indicates the graft rate of the multilayer structure polymer

TABLE 1

| Multilayer Structure Polymer | Unit | Manufacturing Example 3 C1 | Manufacturing Example 4 C2 | Manufacturing Example 5 C3 | Manufacturing Example 6 C4 | Manufacturing Example 7 C5 | Manufacturing Example 8 C6 | Manufacturing Example 9 C7 |
|---|---|---|---|---|---|---|---|---|
| Component (I) | parts by mass | 560.0 | 560.0 | 560.0 | 385.0 | 560.0 | 560.0 | 560.0 |
| First Layer | parts by mass | 245.0 | 245.0 | 245.0 | 70.0 | 245.0 | 245.0 | 245.0 |
| MMA | mass % | 95.4 | 95.4 | 95.4 | 95.4 | 95.4 | 95.4 | 95.4 |
| MA | mass % | 4.4 | 4.4 | 4.4 | 4.4 | 4.4 | 4.4 | 4.4 |
| ALMA | mass % | 0.2 | 0.2 | 0.2 | 0.2 | 0.2 | 0.2 | 0.2 |
| Total | mass % | 100 | 100 | 100 | 100 | 100 | 100 | 100 |
| Second Layer | parts by mass | 315 | 315 | 315 | 315 | 315 | 315 | 315 |
| BA | mass % | 80.4 | 79.7 | 80.4 | 80.4 | 80.4 | 81.5 | 78.6 |
| St | mass % | 17.4 | 17.3 | 17.4 | 17.4 | 17.4 | 17.3 | 17.4 |
| ALMA | mass % | 2.2 | 3 | 2.2 | 2.2 | 2.2 | 0.8 | 4 |
| Total | mass % | 100 | 100 | 100 | 100 | 100 | 100 | 100 |
| Component (II) | parts by mass | 140 | 140 | 140 | 315 | 140 | 140 | 140 |
| MMA | mass % | 95.2 | 90.2 | 94.2 | 95.2 | 95.42 | 90.2 | 99.6 |
| MA | mass % | 3.6 | 8.5 | 3.8 | 3.6 | 3.6 | 9.4 | |
| BzA | mass % | 0.8 | 0.5 | | 0.8 | 0.8 | | |
| CHA | mass % | | | 0.8 | | | | |
| THFA | mass % | | 0.4 | | | | | |
| t-BA | mass % | | | | 0.8 | | | |
| n-OM | mass % | 0.4 | 0.4 | 0.4 | 0.4 | 0.18 | 0.4 | 0.4 |
| Total | mass % | 100 | 100 | 100 | 100 | 100 | 100 | 100 |
| Component (II) Ratio | mass % | 20 | 20 | 20 | 45 | 20 | 20 | 20 |
| Median Diameter De | nm | 285 | 186 | 285 | 285 | 304 | 284 | 185 |
| Graft Rate | mass % | 24 | 24 | 24 | 65 | 24 | 10 | 25 |
| Component (II) Formula Weight | — | 38000 | 38000 | 38000 | 38000 | 62000 | 38000 | 38000 |

Indicated in the row labeled "Component (I)" is the proportion (parts by mass) of the cross-linked rubber polymer component (I) in the multilayer structure polymer (C). Indicated in the row labeled "First Layer" is the proportion (parts by mass) of the polymer component in the first layer of the cross-linked rubber polymer component (I) within the multilayer structure polymer (C). Indicated in the rows labeled MMA, MA, and ALMA are the proportions (mass %) of the respective monomers used to synthesize the polymer component in the first layer.

(C). Component (II) Formula Weight indicates the estimated value of the number average of the formula weight of the polymer component (II).

Manufacturing Example 10

Active Energy Ray-Curable Adhesive 35 weight% of bisphenol A-type epoxy resin (with the product name jER-828 manufactured by Japan Epoxy Resins Co., Ltd.), 59 weight % of 3-ethyl-3-phenoxymethyloxetane (with the product name ARON OXETANE OXT-211 manufactured by Toagosei Co., Ltd.), and as a cationic photopolymerization initiator, 6 weight % of a propylene carbonate solution (with the product name UVI-6992 manufactured by Dow Chemical Company) with a 50% active ingredient having triarylsulfonium hexafluorophosphate as a primary component were blended to obtain the active energy ray-curable adhesive. These source materials were stirred and mixed in accordance with a usual method.

Example 1

80 parts by mass of the methacryl-based polymer (A) and 20 parts by mass of the multilayer structure polymer (C1) were mixed with a Henschel mixer. A melt-compounded product of the above was extruded with a single screw extruder with a diameter of 40 mm to obtain a thermoplastic resin composition in a pellet form.

Then, the pellet-formed thermoplastic resin composition was extruded from a T-die, while being molten, with the use of a vented single screw extruder with a diameter of 65 mm and having the T-die attached thereto. The lip opening of the die lip of the T-die was set to 1 mm. While the extruded thermoplastic resin composition was being subjected to a linear pressure of 30 N/mm between a metal elastic roll and a rigid roll, the thermoplastic resin composition was pulled out. Thus, a thermoplastic resin film having a thickness of 80 μm was obtained.

An acetone dispersion of the multilayer structure polymer (C1) obtained by dissolving the obtained film into acetone was analyzed through a laser diffraction/scattering technique. The median diameter Da was 380 nm. [Da/De] was 1.32.

In addition, the dimensional change on heating of the film and its adhesiveness in the layered product were measured. The results are shown in Table 2. The above applies similarly in the other examples and the comparative examples.

One of the surfaces of the thermoplastic resin film was coated with the active energy ray-curable adhesive with the use of a bar coater. The thickness of the adhesive was 2 μm. Then, a polarizing film having a thickness of 10 μm was superimposed onto the stated surface of the adhesive. The polarizing film was one in which a polyvinyl alcohol (PVA) film was dyed with iodine and stretched as described in the embodiments.

Thereafter, the surface of the polarizing film that was not in contact with the adhesive was coated with the same adhesive as the one described above with the use of a bar coater. The thickness of the adhesive was 2 μm. The same thermoplastic resin film as the one described above was superimposed onto the stated surface of the adhesive. The layered product obtained in this manner was pressed with a roller. The layered product had a layer configuration of thermoplastic resin film/adhesive/polarizing film/adhesive/thermoplastic resin film.

Thereafter, the layered product described above was irradiated with ultraviolet radiation from the side of the film superimposed later in the layered product with the use of a metal halide lamp (manufactured by GC YUASA Corporation). At this point, the duration from the second instance of active energy ray-curable adhesive coating to the start of the ultraviolet radiation irradiation was 10 seconds. The cumulative quantity of light was 700 mJ/cm$^2$. This cumulative quantity of light was measured with the use of a UV meter (manufactured by GS YUASA Corporation). After the irradiation with ultraviolet radiation, the layered product was left to stand for 24 hours at a temperature of 23° C. with a relative humidity of 50% to obtain the layered product (polarizing plate).

Example 2

Emulsion including the acryl-based copolymer (B) and emulsion including the multilayer structure polymer (C1) were mixed at a mass ratio of 1:2 to obtain a homogeneous mixture. A solidified product was obtained from the mixture through freezing solidification.

The solidified product was washed and dried. Thus, 24 parts by mass of a resin mixture was obtained. This resin mixture contained 8 parts by mass of the acryl-based copolymer (B) and 16 parts by mass of the multilayer structure polymer (C1).

76 parts by mass of the methacryl-based polymer (A) was added to the resin mixture. These were mixed with a Henschel mixer. This mixture was melt compounded and extruded with a single screw extruder with a diameter of 40 mm to obtain a thermoplastic resin composition in a pellet form. The processing thereafter was performed in a method similar to that of Example 1, and thus a thermoplastic resin film having a thickness of 80 μm and a polarizing plate were obtained.

Example 3

Emulsion including the acryl-based copolymer (B) and emulsion including the multilayer structure polymer (C2) were mixed at a mass ratio of 1:3.75 to obtain a homogeneous mixture. A solidified product was obtained from the mixture through freezing solidification. The solidified product was washed and dried. Thus, 38 parts by mass of a resin mixture was obtained. This resin mixture contained 8 parts by mass of the acryl-based copolymer (B) and 30 parts by mass of the multilayer structure polymer (C1).

62 parts by mass of the methacryl-based polymer (A) was added to the resin mixture. These were mixed with a Henschel mixer. This mixture was melt compounded and extruded with a single screw extruder with a diameter of 40 mm to obtain a thermoplastic resin composition in a pellet form. The processing thereafter was performed in a method similar to that of Example 1, and thus a thermoplastic resin film having a thickness of 80 μm and a polarizing plate were obtained.

Example 4

A thermoplastic resin film having a thickness of 80 μm and a polarizing plate were obtained by performing the processing in a method similar to that of Example 2 except in that the multilayer structure polymer (C3) was used in place of the multilayer structure polymer (C1).

Example 5

A thermoplastic resin film having a thickness of 80 μm and a polarizing plate were obtained by performing the processing in a method similar to that of Example 2 except in that the multilayer structure polymer (C4) was used in place of the multilayer structure polymer (C1).

Example 6

A thermoplastic resin film having a thickness of 80 μm and a polarizing plate were obtained by performing the processing in a method similar to that of Example 2 except in that the multilayer structure polymer (C5) was used in place of the multilayer structure polymer (C1).

Comparative Example 1

A thermoplastic resin film having a thickness of 80 μm and a polarizing plate were obtained by performing the processing in a method similar to that of Example 1 except in that 100 parts by mass of the methacryl-based polymer (A) was used and no multilayer structure polymer (C) was blended into the methacryl-based polymer (A).

Comparative Example 2

A thermoplastic resin film having a thickness of 80 μm and a polarizing plate were obtained by performing the processing in a method similar to that of Example 2 except in that the multilayer structure polymer (C6) was used in place of the multilayer structure polymer (C1).

Comparative Example 3

A thermoplastic resin film having a thickness of 80 μm and a polarizing plate were obtained by performing the processing in a method similar to that of Example 2 except in that the multilayer structure polymer (C7) was used in place of the multilayer structure polymer (C1).

Comparative Example 2. Specifically, it was found that, as the multilayer structure polymer (C) was blended, the permeability of the active energy ray-curable adhesive into the film improved and a high bonding strength was obtained between the film and the adherend even when the duration from the coating with the active energy ray-curable adhesive to the irradiation with the active energy ray is short.

In Examples 1 to 6 and Comparative Example 3, the suppression of whitening in the layered product was evaluated higher than in Comparative Example 2. This was conceivably because the outer diameter of the multilayer structure polymer (C) was smaller even after the multilayer structure polymer (C) had swollen with the adhesive in Examples 1 to 6 and Comparative Example 3 than in Comparative Example 2. This was speculated on the basis of that the median diameter Da was smaller than 580 nm in Examples 1 to 6. The inventors consider that an effect of suppressing whitening in the layered product can be obtained at a sufficient level by setting the median diameter Da to less than 500 nm.

In addition, it was conceivable that, in Examples 1 to 6 and Comparative Example 3, the change in the outer diameter of the multilayer structure polymer (C) arising when the multilayer structure polymer (C) swelled with the adhesive was smaller than in Comparative Example 2. This was speculated on the basis of that the ratio Da/De of the median diameters before and after the swelling was smaller than

TABLE 2

| | Unit | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Thermoplastic Resin Composition | | | | | | | | | | |
| Methacrylic-Based Polymer (A) | mass % | 80 | 76 | 62 | 76 | 70 | 76 | 100 | 76 | 76 |
| Acryl-Based Copolymer (B) | mass % | | 8 | 8 | 8 | 10 | 8 | | 8 | 8 |
| Multilayer Structure Polymer (C) | | | | | | | | | | |
| C1 | mass % | 20 | 16 | | | | | | | |
| C2 | mass % | | | 30 | | | | | | |
| C3 | mass % | | | | 16 | | | | | |
| C4 | mass % | | | | | 20 | | | | |
| C5 | mass % | | | | | | 16 | | | |
| C6 | mass % | | | | | | | | 16 | |
| C7 | mass % | | | | | | | | | 16 |
| Median Diameter De | μm | 285 | 285 | 186 | 285 | 285 | 304 | | 284 | 185 |
| Graft Rate | mass % | 24 | 24 | 24 | 24 | 65 | 24 | | 10 | 25 |
| Median Diameter Da | μm | 375 | 375 | 244 | 375 | 330 | 460 | — | 580 | 190 |
| [Da/De] | — | 1.32 | 1.32 | 1.31 | 1.32 | 1.16 | 1.51 | — | 2.04 | 1.03 |
| Number Average (Fn) of Formula Weight | — | 38000 | 38000 | 38000 | 38000 | 38000 | 62000 | — | 38000 | 38000 |
| Evaluation of Film | | | | | | | | | | |
| Dimensional Change on Heating | % | −0.3 | −0.3 | −1.0 | −0.3 | −0.4 | −0.3 | −0.1 | −1.8 | −0.2 |
| Evaluation of Layered Product | | | | | | | | | | |
| Adhesiveness | — | A | A | A | A | B | B | C | A | C |
| Suppression of Whitening | — | A | A | A | A | A | A | A | C | A |

<Comparison of Examples and Comparative Examples>

In Examples 1 to 6 and Comparative Example 2, the adhesiveness in the layered product was evaluated higher than in Comparative Example 1. This was conceivably because the multilayer structure polymer (C) was blended in the thermoplastic resin composition in Examples 1 to 6 and 2.04 in Examples 1 to 6 and Comparative Example 3. The inventors consider that an effect of suppressing whitening in the layered product can be obtained at a sufficient level by setting ratio Da/De of the median diameters to less than 2.04.

In Examples 1 to 6 and Comparative Example 3, the dimensional change on heating of the film was smaller than in Comparative Example 2. This was conceivably because the graft rate of the multilayer structure polymer (C) was greater than 10 in Examples 1 to 6 and Comparative Example 3. Accordingly, it was found that setting the graft rate of the multilayer structure polymer (C) to greater than 10 allowed for obtaining a film with high heat resistance.

In Examples 1 to 6, the adhesiveness in the layered product was evaluated higher than in Comparative Example 3. This was conceivably because the multilayer structure polymer (C) had swollen to a sufficient size with the adhesive in Examples 1 to 6, as compared to Comparative Example 3. This was speculated on the basis of that the median diameter Da was greater than 199 nm in Examples 1 to 6. The inventors consider that setting the median diameter Da to no less than 200 nm allows the active energy ray-curable adhesive to permeate into the film at a sufficient level.

In addition, it was conceivable that, in Examples 1 to 6, the change in the outer diameter of the multilayer structure polymer (C) arising when the multilayer structure polymer (C) swelled with the adhesive was greater than in Comparative Example 3. This was speculated on the basis of that the ratio Da/De of the median diameters before and after the swelling was greater than 1.03 in Examples 1 to 6. The inventors consider that setting the ratio Da/De of the median diameters to greater than 1.03 allows the active energy ray-curable adhesive to permeate into the film at a sufficient level.

As the multilayer structure polymer (C) has the median diameter Da of no less than 200 nm when the median diameter Da is measured through a laser diffraction/scattering technique with the thermoplastic resin composition according to the present disclosure dissolved in acetone, the molded product or film including the thermoplastic resin composition can be firmly bonded to an adherend with the active energy ray-curable adhesive provided therebetween. In addition, as the median diameter Da is less than 500 nm, the molded product and the film that are less likely to be whitened even when the adhesive permeates thereinto are obtained.

This application claims priority to Japanese Patent Application No. 2016-106480, filed on May 27, 2016, and the entire disclosure of which is incorporated herein.

REFERENCE SIGNS LIST

C multilayer structure polymer (C), 11 inner layer, 12 outer layer, 16 layer, 18 thermoplastic resin, 21 adhesive, 22 adherend, 23 thermoplastic resin film, 25 double-layer film, 26 layer, 27 layer

The invention claimed is:

1. A thermoplastic resin composition, comprising:
70 to 95 mass % of a thermoplastic resin; and
5 to 30 mass % of a multilayer structure polymer (C) having a multilayer particle structure,
wherein the multilayer structure polymer (C) has a median diameter Da of no less than 200 nm and less than 500 nm when the median diameter Da is measured by a laser diffraction/scattering technique with the thermoplastic resin composition dissolved in acetone, and when a median diameter of the multilayer structure polymer (C) measured by a laser diffraction/scattering technique in water is a median diameter De, the multilayer structure polymer (C) satisfies 1.1<Da/De≤2.0.

2. The thermoplastic resin composition according to claim 1, wherein the multilayer particle structure includes an inner layer and an outer layer covering the inner layer, the multilayer structure polymer (C) is a graft copolymer having a cross-linked rubber polymer component (I) and a polymer component (II) that is graft-bonded to the cross-linked rubber polymer component (I), the cross-linked rubber polymer component (I) includes, as a primary component, an acrylic acid alkyl ester unit having an alkyl group with 1 to 8 carbon and is forming the inner layer, and the polymer component (II) contains 80 to 97 mass % of a methyl methacrylate unit and 3 to 20 mass % of an acrylic acid ester unit and is forming the outer layer.

3. The thermoplastic resin composition according to claim 2, wherein when a ratio of a mass of the graft-bonded polymer component (II) to a mass of the cross-linked rubber polymer component (I) is a graft rate of the graft copolymer, the graft rate is 11 to 33 mass %.

4. The thermoplastic resin composition according to claim 2, wherein the acrylic acid ester unit includes at least one acrylic acid ester unit selected from the group consisting of benzyl acrylate, cyclohexyl acrylate, tetrahydrofurfuryl acrylate, and tert-butyl acrylate, and a number average (Fn) of a formula weight of the graft-bonded polymer component (II) is in a range of 15,000 to 62,000.

5. The thermoplastic resin composition according to claim 2, wherein a proportion of the polymer component (II) relative to 100 mass % of the multilayer structure polymer (C) is 10 to 25 mass %.

6. The thermoplastic resin composition according to claim 1, wherein the thermoplastic resin contains a methacryl-based polymer (A) containing more than 97 mass % of a methyl methacrylate unit.

7. The thermoplastic resin composition according to claim 6, wherein the thermoplastic resin contains the methacryl-based polymer (A) and an acryl-based copolymer (B) containing 80 to 97 mass % of a methyl methacrylate unit and 3 to 20 mass % of an acrylic acid ester unit, the acryl-based copolymer (B) has a glass transition temperature of 90 to 115° C., and the acryl-based copolymer (B) has a number-average molecular weight (MnB) in a range of 15,000 to 50,000.

8. The thermoplastic resin composition according to claim 7, wherein the number-average molecular weight (MnB) and the glass transition temperature (Tg [° C.]) of the acryl-based copolymer (B) satisfy $365 \leq (MnB/1000)+3.5 \times Tg \leq 420$.

9. A molded product, comprising:
the thermoplastic resin composition of claim 1.

10. A film, comprising:
the thermoplastic resin composition of claim 1.

11. The film according to claim 10 wherein a dimensional change obtained when the film is heated for 30 minutes at 100° C. is −2.0 to 2.0%.

12. The film according to claim 10, wherein the film is an optical film.

13. A layered product, comprising:
an adherend; and
the film of claim 10 laminated on the adherend with an active energy ray-curable adhesive provided therebetween.

14. A polarizing plate, comprising:
the layered product of claim 13,
wherein the adherend is a polarizer.

15. The layered product according to claim 13, wherein the active energy ray-curable adhesive is an ultraviolet-curable adhesive.

16. The layered product according to claim 13, wherein the active energy ray-curable adhesive includes a cationically photopolymerizable compound.

17. A thermoplastic resin composition, comprising:

70 to 95 mass % of a thermoplastic resin; and 5 to 30 mass % of a multilayer structure polymer (C) having a multilayer particle structure, wherein the multilayer structure polymer (C) has a median diameter Da of no less than 200 nm and less than 500 nm when the median diameter Da is measured by a laser diffraction/scattering technique with the thermoplastic resin composition dissolved in acetone, the multilayer particle structure includes an inner layer and an outer layer covering the inner layer, the multilayer structure polymer (C) is a graft copolymer having a cross-linked rubber polymer component (I) and a polymer component (II) that is graft-bonded to the cross-linked rubber polymer component (I), the cross-linked rubber polymer component (I) includes, as a primary component, an acrylic acid alkyl ester unit having an alkyl group with 1 to 8 carbon and is forming the inner layer, the polymer component (II) contains 80 to 97 mass % of a methyl methacrylate unit and 3 to 20 mass % of an acrylic acid ester unit and is forming the outer layer, the acrylic acid ester unit includes at least one acrylic acid ester unit selected from the group consisting of benzyl acrylate, cyclohexyl acrylate, tetahydrofurfuryl acrylate, and tert-butyl acrylate, and a number average (Fn) of a formula weight of the graft-bonded polymer component (II) is in a range of 15,000 to 62,000.

18. The thermoplastic resin composition according to claim 17, wherein a proportion of the polymer component (II) relative to 100 mass % of the multilayer structure polymer (C) is 10 to 25 mass %.

19. The thermoplastic resin composition according to claim 17, wherein the thermoplastic resin contains a methacryl-based polymer (A) containing more than 97 mass % of a methyl methacrylate unit.

20. The thermoplastic resin composition according to claim 19, wherein the thermoplastic resin contains the methacryl-based polymer (A) and an acryl-based copolymer (B) containing 80 to 97 mass % of a methyl methacrylate unit and 3 to 20 mass % of an acrylic acid ester unit, the acryl-based copolymer (B) has a glass transition temperature of 90 to 115° C., and the acryl-based copolymer (B) has a number-average molecular weight (MnB) in a range of 15,000 to 50,000.

* * * * *